US012800790B2

(12) United States Patent
Jones et al.

(10) Patent No.: US 12,800,790 B2
(45) Date of Patent: Nov. 17, 2026

(54) LOW POWER QUANTUM SENSOR NETWORKS FOR MONITORING AND TELEMETRY

(71) Applicant: Halliburton Energy Services, Inc., Houston, TX (US)

(72) Inventors: Christopher Michael Jones, Houston, TX (US); Michael Christie, Aberdeenshire (GB); Jeffrey James Crawford, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 281 days.

(21) Appl. No.: 18/442,919

(22) Filed: Feb. 15, 2024

(65) Prior Publication Data

US 2025/0264629 A1 Aug. 21, 2025

(51) Int. Cl.
*G01V 3/30* (2006.01)
*G01V 3/38* (2006.01)

(52) U.S. Cl.
CPC . *G01V 3/30* (2013.01); *G01V 3/38* (2013.01)

(58) Field of Classification Search
CPC .................................. G01V 3/30; G01V 3/38
See application file for complete search history.

(56) References Cited

U.S. PATENT DOCUMENTS 7,362,420 B2 * 4/2008 Zaugg .................... G01S 17/08 356/5.01
2007/0296953 A1 * 12/2007 Allen ........................ G01S 7/41 356/28
2011/0026614 A1 * 2/2011 Allen ...................... G01S 17/10 375/259
2012/0089379 A1 * 4/2012 Conrad .................... G01V 1/40 703/2
2016/0018525 A1 * 1/2016 Lanzagorta ............ G01S 17/93 701/472
2016/0356917 A1 12/2016 Bhongale
2016/0363690 A1 * 12/2016 Bhongale ............. E21B 47/135
2018/0038956 A1 * 2/2018 Habif ...................... G01S 13/10
2018/0223653 A1 * 8/2018 Stark ....................... E21B 49/00
2018/0255212 A1 9/2018 Sprigg et al.

OTHER PUBLICATIONS

International Search Report & Written Opinion; PCT Application No. PCT/US2024/016459; mailed Oct. 30, 2024.

* cited by examiner

*Primary Examiner* — Nazra Nur Waheed

(74) *Attorney, Agent, or Firm* — Michael Jenney; C. Tumey Law Group PLLC

(57) ABSTRACT

Aspects of the subject technology relate to systems, methods, and computer-readable media for outfitting wells to include quantum devices and to use quantum devices that are deployed in a wellbore. Apparatus of the present disclosure may be deployed in existing wellbores or may be built into new wellbores. This may help reduce complexity, risk, and cost of installation while increasing reliability as compared to other sensing solutions. As such new forms of quantum sensing technologies may provide a more adaptable and cost-effective solution for deploying sensors in a wellbore or for communicating with equipment located inside of a well.

20 Claims, 10 Drawing Sheets

LOW POWER QUANTUM SENSOR NETWORKS FOR MONITORING AND TELEMETRY

TECHNICAL FIELD

The present technology pertains to improving the operation of sensors, and more particularly, to the deployment and use of quantum devices that may include quantum sensors.

BACKGROUND

When managing oil and gas drilling and production environments (e.g., wellbores, etc.), performing operations in the oil and gas drilling and production environments, and/or sequestering materials in subterranean strata, it is important to sense data and to make determinations regarding sensed data. Wellbore environments are inherently noisy and sensors used to sense wellbore conditions can be affected by this noise. Noise encountered in the wellbore environment that may affect sensors include mechanical noise (e.g., noise from vibration, seismic activity, the movement of fluids, or the movement of equipment), thermal noise (e.g., Johnson noise—electronic noise generated from thermal agitation of electrons or other carriers of charge), electromagnetic noise (e.g., noise associated with radio frequency signals or electromagnetic fields associated with manmade devices or with natural phenomenon), and noise associated with subatomic particles (e.g., radiation).

One or more types of noise may affect the signal to noise ratio (SNR) associated with a sensor or a sensing system. The greater the noise affecting a sensor or sensing system reduces the SNR. In certain instances, a level of SNR may affect operation of a sensor or a sensing system and in certain instances, a measure of SNR that is below some threshold level may cause a sensor or a sensing system to an extent that limits utility of the sensor or the sensing system.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings.

DETAILED DESCRIPTION

Figure 1:
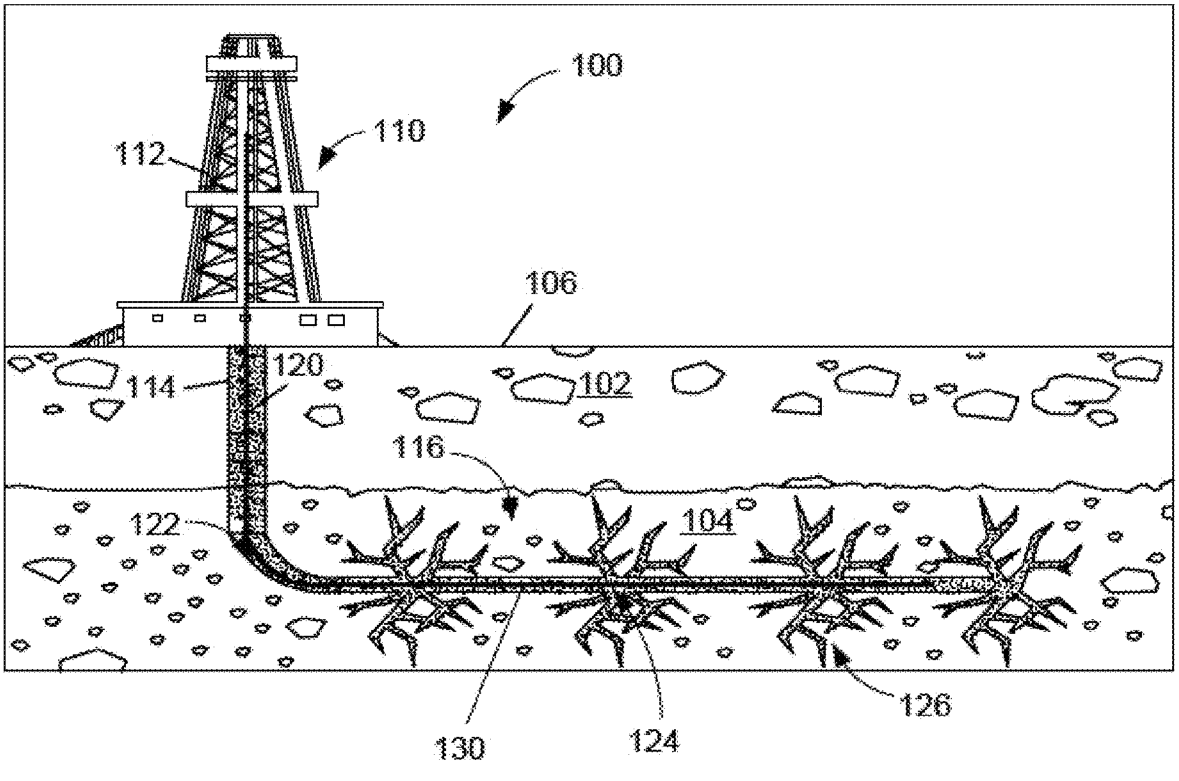
FIG. 1 illustrates a schematic view of an example wellbore operating environment, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Described herein are systems, apparatuses, processes (also referred to as methods), and computer-readable media (collectively referred to as "systems and techniques") for collecting and evaluating data sensed by sensors. Data may be collected by quantum sensors and communicated, using techniques that exploit quantum entanglement, or other quantum effects. Such sensors may be placed in a wellbore such that sensing systems that make determinations using data sensed by these sensors make more accurate determinations. Quantum sensors and sensing systems may also be more cost effective to deploy and manage. As such, applied quantum technology may help improve how wellbores are operated, managed, and built.

Systems and techniques of the present disclosure may be deployed in wellbores that have already been drilled and completed. Typically, the outfitting of an already drilled and completed petroleum well with electrical or fiber-optic lines is a significant challenge and can be very costly to implement. Furthermore, traditional well completion processes are not well suited to accommodate the addition of new sensors post-completion. Installing such lines may necessitate penetrating the well casing and cement sheath—this is a task that carries the risk of compromising the integrity of a wellbore. Additionally, the depth and tortuosity of many petroleum wells further complicate this process, as running sensing or communication lines would need to be run for potentially several kilometers through a harsh environment under high pressure and high temperature conditions. Furthermore, risks associated with damaging conventional sensors using long lines are substantial. Retrofitting operations also present logistical issues, including potential well downtime and associated costs. Moreover, even when these lines are successfully installed, they are still prone to failures that are costly to perform. As such new forms of sensing technologies may provide a more adaptable and cost-effective solution for deploying sensors in a wellbore or for communicating with equipment located inside of an existing well.

Incorporating power and telemetry infrastructure into the initial design and construction of a petroleum well introduces significant added expenses and technical complexities. The cost of materials, including specialized casing designs or additional conduits for power and data cables, can be substantial. Furthermore, the specialized equipment and expertise needed for the installation of these components introduce further costs. These complexities also extend the well's drilling and completion timeline, adding to the overall project costs through increased personnel hours and equipment rental time. Operating in a high-pressure, high-temperature environment, these systems are exposed to harsh conditions, which can lead to premature failure and necessitate costly repairs or replacements. Moreover, the inclusion of such infrastructure in the well's design demands more advanced planning and coordination, introducing potential delays and extra engineering costs. Given these factors, the substantial upfront investment in designing and constructing a well with power and telemetry capabilities often makes it prohibitively expensive for many operations, particularly when considering the risks and ongoing maintenance costs involved.

One aspect of the present disclosure is to overcome the formidable challenges associated with retrofitting existing wellbores with sensors and to overcome challenges associated with including conventional sensors in the building of new wellbores. In some instances, By equipping an existing well with a robust quantum sensor/device network, techniques of the present disclosure may allow for the retrofitting of wells with miniaturized, low-power sensors capable of operating under the harsh conditions encountered within petroleum reservoirs. This innovative approach may help eliminate the need for complex and costly installation of power and telemetry lines. Instead, the sensor network leverages advanced quantum technologies and wireless communication methods to capture and relay subsurface data. By drilling small penetrations into the well casing and cement sheath, these sensor units can be inserted directly into the rock formation, ensuring direct contact with the subsurface environment. This provides real-time data on changes in fluid content and other reservoir parameters, critical for optimizing processes such as carbon sequestration and enhanced oil recovery. One goal is a more cost-effective, adaptable, and less intrusive solution that could revolutionize how we monitor and manage subsurface operations. For a well under construction, the placement of the sensors may be drilled into the formation prior to casing and cementing the well. In this case, the sensors may be inexpensively placed at optimal locations independent of casing sections. Alternatively, sensors could be pre-installed in casing to simplify the installation process at the potential expense of optimal placement.

FIG. 1 illustrates a schematic view of an example wellbore operating environment. As depicted in FIG. 1, the operating environment 100 includes a wellbore 114 that penetrates a formation 102 for the purpose of recovering hydrocarbons, storing hydrocarbons, injecting of water or carbon dioxide, or the like in formation 104. In certain embodiments, the purpose of the operating environment 100 is carbon capture & storage (CCS) and includes equipment associated with that purpose (not shown in FIG. 1). In certain embodiments, the purpose of the operating environment 100 is geothermal energy capture and includes equipment associated with that purpose (not shown in FIG. 1).

As depicted in FIG. 1, formation 102,104 are subterranean formations, although it is noted that formations 102, 104 may be a subsea formation. In certain locations, there are a plurality of underground formations 102, 104. The wellbore 114 may extend substantially vertically away from the Earth's surface 106 over a vertical wellbore portion, or may deviate at any angle from the Earth's surface 106 over a deviated or horizontal wellbore portion 116. In alternative operating environments, portions or substantially all of the wellbore 114 may be vertical, deviated, horizontal, and/or curved. The wellbore 114 may be drilled into the formations 102, 104 using any suitable drilling technique. As shown, a drilling or servicing rig 110 disposed at the surface 106 (which may be the surface of the Earth, a seafloor surface, or a sea surface) comprises a derrick 112 from which a tubular string 120 (e.g., a drill string, a tool string, a segmented tubing string, a jointed tubing string, or any other suitable conveyance, or combinations thereof) is positioned within or partially within the wellbore 114. The tubular string 120 may include two or more concentrically positioned strings of pipe or tubing (e.g., a first work string may be positioned within a second work string). The drilling or servicing rig 110 may include a motor driven winch and other associated equipment for lowering the tubular string into the wellbore 114. Alternatively, a mobile workover rig, a wellbore servicing unit (e.g., coiled tubing units), or the like may be used to lower the work string into the wellbore 114. In such an environment, the tubular string 120 may be utilized in drilling, stimulating, completing, or otherwise servicing the wellbore, or combinations thereof. A drilling or servicing rig 106 may also comprise other equipment. In certain types of operations, a fluid 122 is forced down the tubular string 120 and out through perforations 124 to fracture the formations 104 that surround the perforations 124.

While FIG. 1 depicts a stationary drilling rig 106, one of ordinary skill in the art will readily appreciate that mobile workover rigs, wellbore servicing units (such as coiled tubing units), and the like may be employed. In the context of subsea environments and/or subsea formations, one of ordinary skill in the art will appreciate that conventional fixed platforms, vertically moored platforms, spar platforms, semi-submersible platforms, floating production facilities, and sub-sea completion facilities and the like may be employed. It is noted that while the figures or portions thereof may exemplify horizontal or vertical wellbores, the principles of the presently disclosed apparatuses, methods, and systems, may be similarly applicable to horizontal wellbore configurations, conventional vertical wellbore configurations, deviated wellbore configurations, and any combinations thereof. The horizontal, deviated, or vertical nature of any figure is not to be construed as limiting the wellbore to any particular configuration or formation.

The operating environment 100 includes one or more sensors 130 deployed in the wellbore 114. The operating environment 100 can include a completed well and the one or more sensors 130 can be deployed in the wellbore 114 after a well completion phase. Alternatively, the operating environment 100 can be during a well completion and the one or more sensors 130 can be deployed in the wellbore 114 after the well completion phase.

The systems and techniques of the present disclosure may utilize quantum technologies. Systems and apparatus of the present disclosure may be built using one or more or a combination of types of devices that exploit quantum effects according to the laws of quantum mechanics (QM). As such, principals of QM form the basis of relatively new fields of endeavor of quantum computing and quantum sensing.

Certain elements have been shown to emit photons when those elements have been stimulated. Sets of photons, referred to as “entangled photons” have been generated using various techniques. Sensing elements may be made from materials that have high band gaps and specific sorts of defects that renders lattices of molecules sensitive to quantum effects. One-way entangled photons have been generated is by passing laser light through crystals that split the light into two streams of photons. A pair of photons that are entangled have been experimentally shown to have opposite spins and the theory of QM anticipates that when one of these entangled photons is disturbed, the second of these entangled photons will be disturbed in an opposite manner.

One type of material that demonstrates quantum effects are molecules of diamond that include a defect in their lattice structure. One example of a lattice that exhibits quantum effects is a diamond molecule that has a vacancy and a nitrogen atom in the lattice instead of carbon atoms in each bond point of the diamond lattice. Such a lattice configuration is referred to as a nitrogen vacancy (NV) in diamond. Like diamond, other types of materials have similar types of lattice defects that can be exploited based on their quantum sensitivities. For example, in the future defective lattice structures in silicon carbide, lithium niobate, aluminum nitride, germanium, silicon nitride, boron nitride, and potentially other materials may be used in quantum devices. NV diamond lattices as well as other similar defective lattices are sometimes sensitive to photons passing into the lattice of a diamond molecule. In instances when a photon is absorbed, states associated with that photon may be identified. Whether or not a particular photon is absorbed by a lattice may be associated with features of the lattice and the frequency of the photon. For example, photons of a certain color may be absorbed by the lattice when photons of other colors are not. As such, a photon may pass through the lattice or the photon may be absorbed by the lattice. The absorption energy from the photon by a lattice may correspond to a resonate frequency of the lattice. As such, by observing the resonance of the lattice, determinations regarding the spin state or other states of the photon may be identified. One method for observing such resonances is by monitoring a lattice with a laser.

Quantum illumination is the use of quantum effects that may include quantum entanglement. Quantum entanglement may be used to enhance the resolution of detection systems. Systems and techniques of the present disclosure may use quantum illumination to increase the resolution of a ground penetrating radar (GPR) apparatus, quantum networks may be formed when multiple quantum devices communicate or otherwise transfer data, and techniques of the present disclosure may use quantum detectors to collect data regarding subterranean structures in the vicinity of a wellbore.

Furthermore, emitters that emit photons of light or photons associated with other frequencies of the electromagnetic spectrum (e.g., radio frequency (RF) photons) may be used in a data transmission or relaying process. Such photon emitters may include miniature lasers or photon generators that are built into chips (e.g., devices using semiconductor processes, commonly referred to as semiconductor chips). Such emitters may only require nanowatts of energy to generate photons. Furthermore, techniques and/or devices of the present disclosure may generate entangled photons using energy harvested from the environment. As such, “on-chip” nanowatt lasers or photon generators may be used to generate entangled photons that in turn are used to communicate data to other devices (e.g., a quantum detector) or to collect data regarding objects that are near a device that emits photons and that senses reflections associated with those emitted photons.

Figure 2:
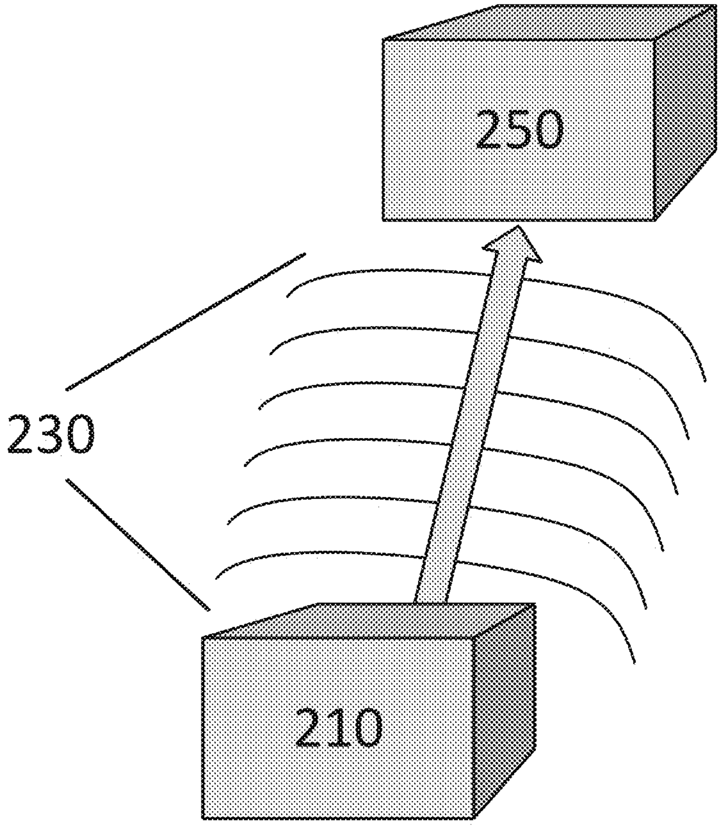
FIG. 2 illustrates a quantum emitter and a quantum detector that may be configured to act as a sensor system or as part of a quantum network, in accordance with various aspects of the subject technology.

FIG. 2 illustrates a quantum emitter and a quantum detector that may be configured to act as a sensor that can operate independently or with other quantum sensors, e.g. as part of a quantum sensor network. FIG. 2 includes quantum emitter 210 and quantum detector 250. When quantum emitter 210 emits photons/particles 230, those photons may react with or pass through a sensing element of quantum detector 250. When a photon reacts with a sensing element of quantum detector 250, energy may be absorbed by the sensing element. As mentioned above, an example of a sensing element is a diamond lattice that has a nitrogen vacancy (NV) defect. When a photon passes into this lattice, it may be absorbed by that lattice. This may stimulate a resonance in the lattice that energy states of electrons within the lattice increasing. This increased energy state of the electrons may be short lived, however. As such, this energy may be released via a second photon being emitted by the lattice. This second photon could in turn impact another lattice of another quantum detector. Such effects may be stimulated by energy from either light photons or RF photons and may be related to electrons of a compound (e.g., an NV diamond lattice) being excited to a transition energy level.

As will be discussed in greater detail later, the sensed photon or particle can be quantumly entangled with another particle. This other particle can be referred to as an idler particle that can be compared to the sensed particle. As follows, the comparison of the idler particle with the sensed particle can be used to quantify interactions that the particle has, e.g. with the surround wellbore and formation. Further, properties of the wellbore and formation can be determined based on this comparison.

These effects may be similar to processes that describe the photoluminescence effect of certain compounds. Photoluminescence relates to energy from photons of electromagnetic radiation being absorbed by a compound that initially increases the energy level of electrons in the compound. When these stimulated electrons fall back to their original energy state, the compound emits light. This may include a light photon impacting a lattice of a sensing element, the light transferring energy into the lattice which result in energy states of electrons in the lattice increasing. Momentum of the stimulated electrons can decrease, resulting in their energy being released by the lattice in the form of light. In certain instances, the absorption of electrons or photons with frequencies other than those frequencies commonly associated with light may create a similar effect that may be referred to as an electromagnetic-luminescence effect. For example, RF photons that are absorbed could result in light photons being emitted.

In certain instances, quantum amplifiers may be used in devices of the present disclosure. One example of a quantum amplifier is a Johnson junction amplifier (JPA) another is a quantum linear amplifier (QLNA). As such, techniques of the present disclosure may include receiving RF photons, providing those photons to an amplifier for amplification, and then transmitting the amplified without destroying coherence of the entangled photons.

The concept of quantum detection within this context can leverage the properties of defect centers in crystal lattices, such as nitrogen vacancy (NV) centers in diamond. NV centers, are essentially spots in the diamond lattice where a nitrogen atom replaces a carbon atom and an adjacent lattice site is vacant. Defective lattice structures that include NV centers or other forms of similar defects possess unique electronic properties that can be manipulated and detected optically. They can serve as highly sensitive quantum sensors, enabling the detection and processing of single photons. The sensor chip uses these NV centers to mix a photon (e.g., an RF photon) that retains the entanglement of an original optical probe photon, with an on-chip idler photon. This process may be used as a quantum detection mechanism. Furthermore, the combination of the RF photon and optical idler photon brings an additional advantage: the possibility of using silicon-based (or other types of semiconductor based) detectors. Semiconductor detectors offer numerous benefits for a quantum system, including low noise, high speed, and temperature resistance, all crucial parameters for reliable operation in the harsh wellbore environment. Thus, this ingenious application of NV centers and silicon detectors facilitates highly sensitive and efficient quantum detection, a potential cornerstone of a sensor network proposed in the present disclosure.

Some quantum devices are capable of detecting electrons. For example, sensors that include n-type and p-type semiconductor materials may generate electrical signals when those sensors are impacted by electrons. Such sensors may be used in applications like electron microscopy. As such, devices that use light photons, RF photons, and/or electrons may be used in quantum sensing applications.

To detect the returned signal photons, quantum detectors, which operate on principles of quantum mechanics, may be incorporated into the sensor design. These detectors offer exceptional sensitivity and can detect individual photons, the smallest units of light. Their high sensitivity, combined with the low-power operations of the quantum illumination process, facilitates the creation of an efficient, low-power sensing system. This low-power operation is critical in enabling the energy harvesting technologies or long-life power sources that the sensor network relies on. This integration of quantum illumination, quantum networks, and quantum detectors, along with RF emission for communication, paves the way for an advanced sensor network capable of revolutionizing subsurface reservoir monitoring and management. Techniques of the present disclosure include deploying sensing devices and networks of devices in hostile environments like those encountered in an oil or gas well.

Quantum detectors may be configured to receive electromagnetic energy from one point to another or from one point to many points serially or in parallel, based on the particular techniques and devices that are used. In certain instances, a quantum detector may be a semiconductor device that may include semiconductor materials that are coupled to a detection circuit.

In certain instances, photons emitted by a quantum emitter may be in the form of radio frequency (RF) photons. When an RF photon impacts or passes through the sensing element of quantum detector, the sensing element may be disturbed and this disturbance may then be converted into an electrical signal, for example, used to transfer a signal to or through another device. Circuits may also be used to generate an output signal in a way similar to the function of a set of coils of a transformer that transforms an electrical signal into electromagnetic energy and back into the electrical signal. Such an effect may be implemented by a device that receives photons of one type of photon (e.g., RF photons), converts those received photons into a second type of photon (e.g., light photons), converts the photons of the second type to photons of the first type, and then transmits the photons of the first type via transmitters to another device. Alternatively or additionally, individual or a stream of photons emitted by a quantum source may be reflected off structures that direct the photons toward another structure. The photons could then arrive at a detector that senses the state of the photons.

Figure 3:
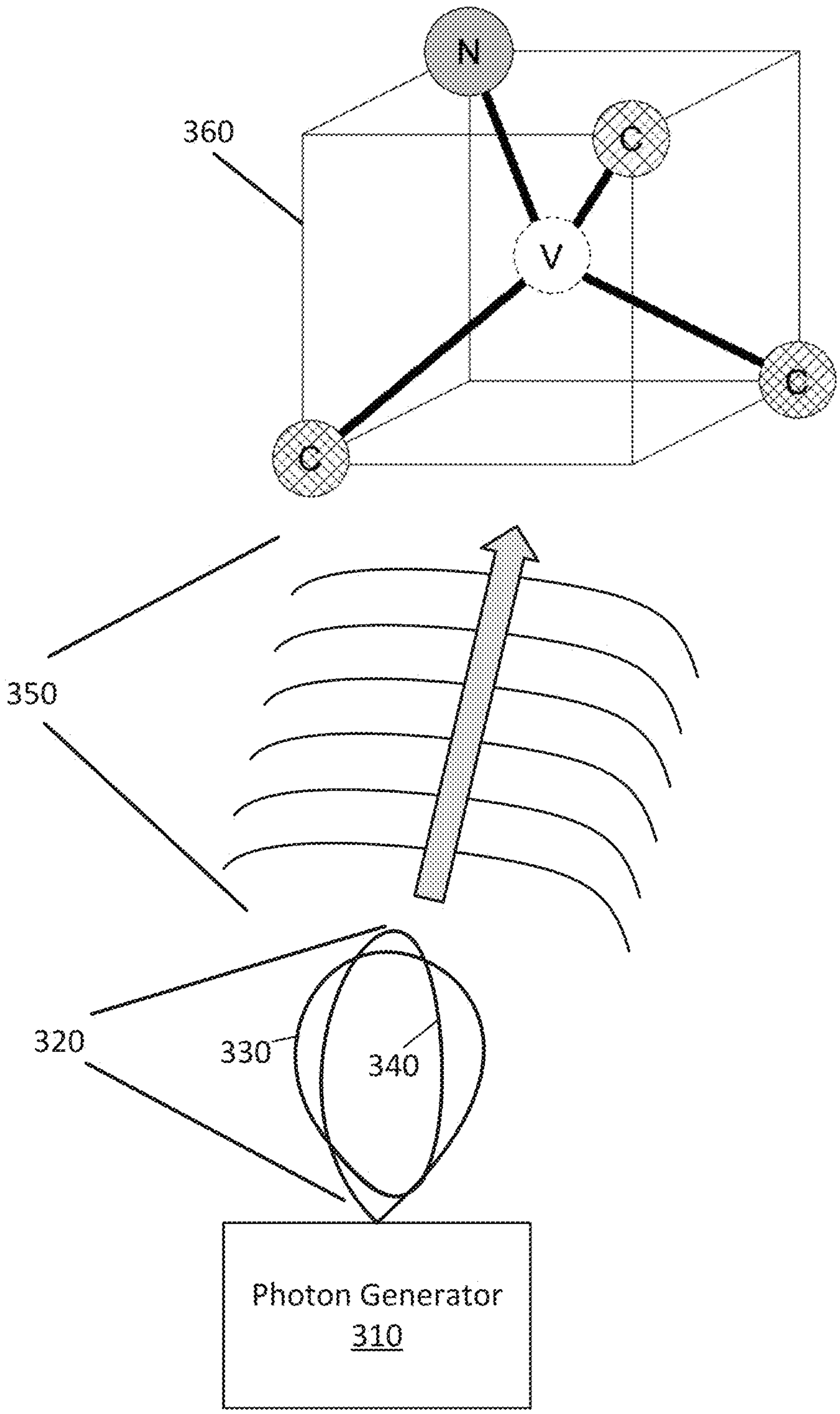
FIG. 3 illustrates a dual ring cavity and four wave mixing that may be used to generate RF photons from entangled light photons, in accordance with various aspects of the subject technology.

FIG. 3 illustrates a dual ring cavity and four wave mixing (FWM) that may be used to generate RF photons from entangled light photons. A source for the entangled photons may be a nano-watt laser that provides photons to a dual ring cavity. Such a nano-watt laser may be part of photon generator 310 and dual ring cavity 320 maybe fabricated into one or more chips. The chips may be made using processes that are similar to making other types of semiconductor chips and may be made using semiconductor materials.

Once the entangled photons are produced by photon generator 310, the photons may be sent into dual ring cavity 320 that may be a specially designed cavity. This cavity may include two overlapping optical rings 334 and 340 that have subtly different path lengths. As the photons generated by photon generator 310 traverse these slightly different paths, their overlap results in an evanescent coupling. An evanescent coupling is when electromagnetic waves decay over time in a manner that result in an emission of energy based on resonance. The energy emitted by the evanescent coupling may be in the form of one or more RF photons 350. These RF photons may impact or pass through a lattice 360 that is sensitive to these RF photons 350. Lattice 360 of FIG. 3 is a diamond molecule that includes a nitrogen atom N, a vacancy in the lattice structure V, and several carbon atoms C.

This structure of the dual ring cavity 320 results in a process that may be referred to as four wave mixing (FWM). FWM may be described as a nonlinear optical process that involves the interaction of different light waves within a medium, leading to the generation of new light or other electromagnetic waves at different frequencies. Slight differences in the lengths of the dual rings 330 versus 340 may result in the emission of radio frequency (RF) photons that may be in the frequency range of 2 to 500 MHz, for example. These RF photons may retain the same states as their light counterparts. The FWM process occurring within the overlapping ring cavities enables the conversion of the input light waves into these RF photons. The emitted RF photons may then be used for communication between relay units and/or sensor relay units that may include lattice 360. Such a quantum system may help ensure efficient and reliable transmission of information.

This combination of on-chip nanowatt lasers, entangled photon generation, a dual ring cavity setup, and the application of four wave mixing represents a new groundbreaking approach to low-power sensor technology. This system not only promises superior sensor performance but also can ensure robust and secure communication capabilities, all within the constraints of the demanding wellbore or other environment. A technique performed by the conversion of light photons to RF photons may be referred to as a down conversion through a dual ring cavity based on the mixing of waves (e.g., four waves) of energy. This technique may allow for the design of specific relative sizes (e.g., lengths and/or widths) of cavities that stimulate evanescent interactions of light photons to generate RF photons with specific characteristics (e.g., frequency).

A photon generator device may include multiple sets of dual ring or multiple ring cavity arrangements that may selectively be used to transmit RF signals with different characteristics (e.g., frequency). As such, information may be transmitted using different sets of RF photons with different characteristics (e.g., frequency). Such a method could be referred to as quantum enhanced shift key data transmission or quantum generated shift key data transmission. Detectors that detect these different characteristics may include multiple different lattice structures that are each tuned to receive signals with a specific characteristic (e.g., frequency).

Another type of quantum sensor, referred to as a qubit in crystal lattice, may be built in a two-dimensional (2D) layer of boron nitride. Such sensors may include an artificially created spin defect in a crystal lattice of boron nitride. Disturbances to the angular spin of electrons in this lattice may make the lattice sensitive to magnetic fields, temperature, and pressure. Measurements may be made optically using a laser. Here again, a nanowatt laser may be employed to make measurements of disturbed spins. As such, the lattice 360 illustrated in FIG. 3 could be part of a detector that detects signals sent from a device that generates photons.

Techniques of the present disclosure may include generating photons or using laser light to detect photonic signals using miniature lasers. As such, modern quantum technology is driving a need for the design and integration of on-chip nanowatt lasers. These ultra-low-power lasers may be integral to generating the entangled photon pairs that are used for quantum illumination. Alongside the laser, the chip may also include a squeezing mechanism. Squeezing is a quantum process that reduces the uncertainty in one property of a particle at the expense of increasing the uncertainty in another property, a manifestation of the Heisenberg uncertainty principle. In the context of light, squeezing can enhance the precision of measurements by reducing the uncertainty in one parameter of light (such as phase or amplitude), critical for generating high-quality entangled photon pairs.

The sophisticated design of quantum sensors allows them to operate at incredibly low power levels, e.g. in the range of nanowatts for efficient functionality. The same is true for nanowatt lasers. To enable self-sustaining operation in the remote and inaccessible wellbore environment, various energy harvesting technologies can be employed. These technologies can convert the ambient energy within the wellbore into usable electrical power, often at the microwatt level, comfortably exceeding the nanowatt requirements of the sensors and lasers. Thermoelectric Generators (TEGs), for example, exploit temperature differentials often found within wellbores to generate electricity. Fluid Flow Energy Harvesters, on the other hand, leverage the energy from the flow of fluids within the well. More advanced technologies like Radioisotope Thermoelectric Generators (RTGs) and Betavoltaics can use the decay of radioactive isotopes to produce reliable, long-lasting power. Similarly, Triboelectric Nanogenerators (TENGs) generate power from friction, while Piezoelectric Energy Harvesters convert mechanical stress, common in such environments, into electricity. These energy harvesting techniques provide a sustainable power solution, making the sensor network operationally independent and capable of long-term function without external power sources.

Figure 4:
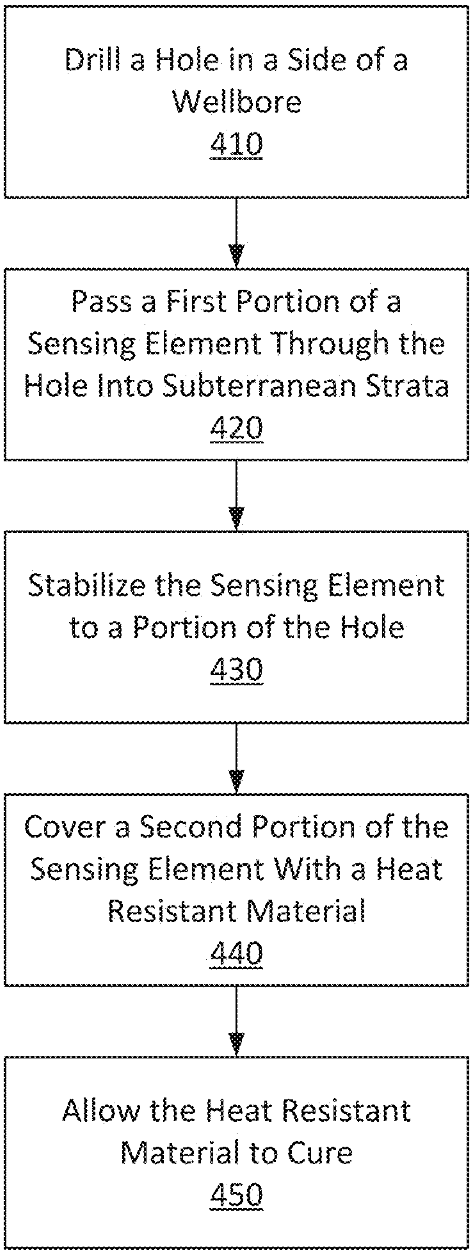
FIG. 4 illustrates actions that may be performed when a quantum sensor is installed in a wellbore, in accordance with various aspects of the subject technology.

FIG. 4 illustrates actions that may be performed when a quantum sensor is installed in a wellbore. In order to retrofit the well with a sensor network, the sensors may be placed within the well and secured in place in a manner that protects the sensor. At block 410 a hole may be drilled into a portion of the wellbore. This may include drilling a hole through a wellbore casing and through cement that attaches the wellbore casing to subterranean formations using conventional or adapted wellbore equipment. The hole size may be selected based on a criterion or set of wellbore rules. The hole size may be selected based on a reliability rule, may be selected based on a cross-sectional size of a sensor, or both. A drill bit used to drill through the casing may be selected based on cross-sectional size of the sensor. Examples of hole sizes that may be used are one eighth of an inch and one sixteenth of an inch. This hole may also penetrate into the subterranean strata that surrounds the wellbore (e.g., a subsurface rock formation). This meticulous drilling operation may require precision to avoid damaging the integrity of the wellbore and a wellbore rule may dictate an amount of time and/or energy required to drill the hole.

By equipping an existing well with a robust sensor network. The existing wells may be retrofitted with miniaturized, low-power sensors capable of operating under the harsh conditions encountered within petroleum reservoirs. This approach can eliminate the need for complex and costly installation of power and telemetry lines. Instead, the sensor network can leverage advanced quantum technologies and wireless communication methods to capture and relay subsurface data. By drilling small penetrations into the well casing and cement sheath at block 410, these sensor units can be inserted directly into the rock formation, ensuring direct contact with the subsurface environment. Data from these sensors may provide real-time data that may be evaluated to identify changes in fluid content and other reservoir parameters. Such techniques may be critical for optimizing processes such as carbon sequestration and enhanced oil recovery. For a well under construction, the placement of the sensors may be drilled into the formation prior to casing and cementing the well. In this case, the sensors may be placed at optimal locations independent of casing sections and very inexpensively. Alternatively, sensors could be pre-installed in casing to simplify the installation process at the expense of optimal placement.

At block 420, at least a portion of the sensor may be inserted into the hole. In certain instances, the sensor may have the shape of an elongated wire-like device that is passed through the hole (e.g., hole in the wellbore casing and cement) such that the portion of the sensor is located within the rock formation. This may allow the sensor to gather real-time data from an area of a subterranean reservoir located where the sensor is located. The base of the sensor may be tailored to fit into a countersink portion of the drilled casing. This may help facilitate a secure installation of the sensor.

At block 430, the sensor may be stabilized in at least a portion of the hole. This may help ensure that the sensor remains firmly in position. This may include anchoring the sensor in place using an epoxy resin or other attachment mechanism. A resin or other adhesive may be selected based on one or more attributes that may include temperature resistance, corrosion resistance, and bond strength. After the sensor has been placed through the wellbore and into the formation, the epoxy resin may be applied to secure the sensor in place. The resin may not only hold the sensor in place but also form a seal. Such a seal may help to maintain the integrity of the wellbore and prevent fluids from leaking into the wellbore casing. When epoxy resins are used, those resins may be cured in place based on temperature, elapsed time, or on the application of light.

Given the potentially harsh conditions within the wellbore, additional measures may be taken to safeguard the base of the sensor, specifically the section located within the countersink portion of the casing may be protected. This protection may be accomplished using a curing ceramic material, similar to those used in dental applications. This ceramic coating may serve as a hard, resilient shield for the sensor base, defending against abrasive forces, corrosive substances, and extreme temperature changes typical of wellbore environments. The ceramic material may be extruded by an extrusion device. By encasing the base of the sensor in this durable ceramic, the lifespan and reliability of the sensor may be significantly enhanced, thus enabling the sensor to function optimally over an extended time period. At block 440, a second portion of the sensor (e.g., the base portion) and/or the resin may be covered with a heat resistant material. For example, the ceramic material may be applied to a counter sunk portion of the casing. The ceramic material may be selected from a group of ceramics.

In certain instances, actions discussed in respect to block 430 and block 440 may be performed as a single operation. Such an operation may attach the sensor, isolate an internal portion of the wellbore from subterranean formation, and cover a portion of the sensor. This may include combing an epoxy resin material with a ceramic material in a nozzle that dispenses and/or mixes the epoxy resin with the ceramic material. In yet other instances, only a ceramic or material other than epoxy may be used to attach and/or seal the sensor.

In instances when blocks 430 and 440 are distinct operations, actions performed at blocks 430 and 440 may result in varying harness of a structure that adheres the sensor to the wellbore casing. For example, a cured epoxy resin may have a first hardness that is less than a second hardness of a cured ceramic material.

At block 450 the material or materials used to attach and/or protect the sensor may be allowed to cure. While not illustrated in FIG. 4, more than one curing action may be performed. For example, the resin may be allowed to cure before the ceramic material is dispensed and then the ceramic material may be dispensed and cured. Alternatively, only a single curing operation may be performed.

The RF emissions produced by the sensors can be harnessed for a quantum version of ground-penetrating radar (GPR), enabling the detection and imaging of subsurface structures within the formation. The basic principle of GPR involves the transmission of high-frequency RF waves into the ground. These waves then interact with subsurface structures and boundaries, reflecting back towards the surface (and/or wellbore sensors) where they are detected and used to create an image of the subsurface. By employing quantum technologies, the system can leverage the unique properties of entangled photons, such as enhanced sensitivity and resolution, to significantly improve the performance of the GPR. Quantum GPR can effectively discern the subtle dielectric and resistivity contrasts within the formation, providing a detailed understanding of the reservoir's structure and composition.

Figure 5:
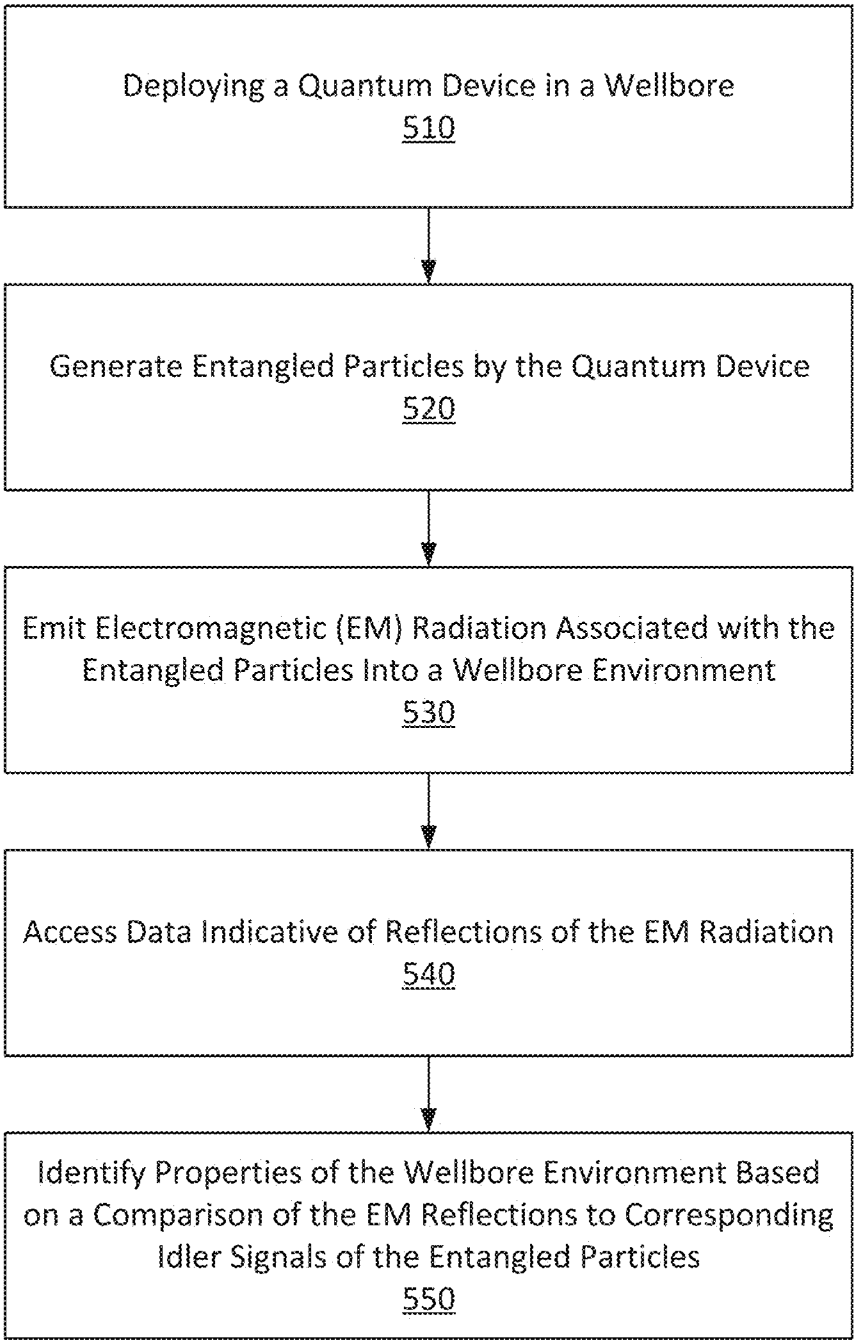
FIG. 5 illustrates actions that may be performed when radiation is emitted into an environment using quantum devices and when reflections of that radiation are received, in accordance with various aspects of the subject technology.

FIG. 5 illustrates actions that may be performed when radiation is emitted into an environment using quantum devices and when reflections of that radiation are received. At block 510 a quantum device may be deployed in a wellbore. This device may be included in or be coupled to the quantum sensors discussed herein. At block 520 entangled particles may be generated by the quantum device. The entangled particles may be used to generate electromagnetic (EM) radiation as discussed in respect to FIG. 3. As such the EM emitted at block 520 may be RF photons.

This EM radiation may be in the form of RF photons that are emitted into an environment that surrounds the quantum device. This means that RF energy may be emitted into subterranean strata, that RF energy may reflect off features of that strata, and that the reflected RF energy may be received at detector that senses RF energy. This also means that received reflections are data from which the subterranean features and/or properties of the wellbore environment may be identified.

This may include transmitting data up the wellbore using techniques discussed in respect to FIG. 3, for example. The data may be received by a computer that performs analysis on collected data. At block 540 the data indicative of the reflections of EM radiation may be accessed. At block 550 properties of the wellbore environment may be identified based on a comparison of the EM reflections to corresponding idler signals of entangled particles.

Quantum illumination leverages the unique properties of entangled photon pairs. These entangled photon pairs have a strong correlation that may be used to enhance the sensitivity and resolution of detection systems or devices. This may include generating entangled photons at photon source, splitting entangled photons in into a signal pair and an idler pair of photons. In one example, a signal photon may be sent into an environment, while a related idler photon is retained at a sensing device. Reflections of the signal photon may be received and compared with the idler photon information such as (spin state and photon state). This may include comparing any reflection from the signal photon with the idler photon. This may result in improving improved signal-to-noise ratios (SNR) as compared to using apparatus that do not utilize quantum effects. This may be particularly beneficial in challenging environments like a wellbore environment. By leveraging quantum phenomena, quantum sensors can achieve a high degree of sensitivity and resolution, even while operating at incredibly low power levels.

Figure 6:
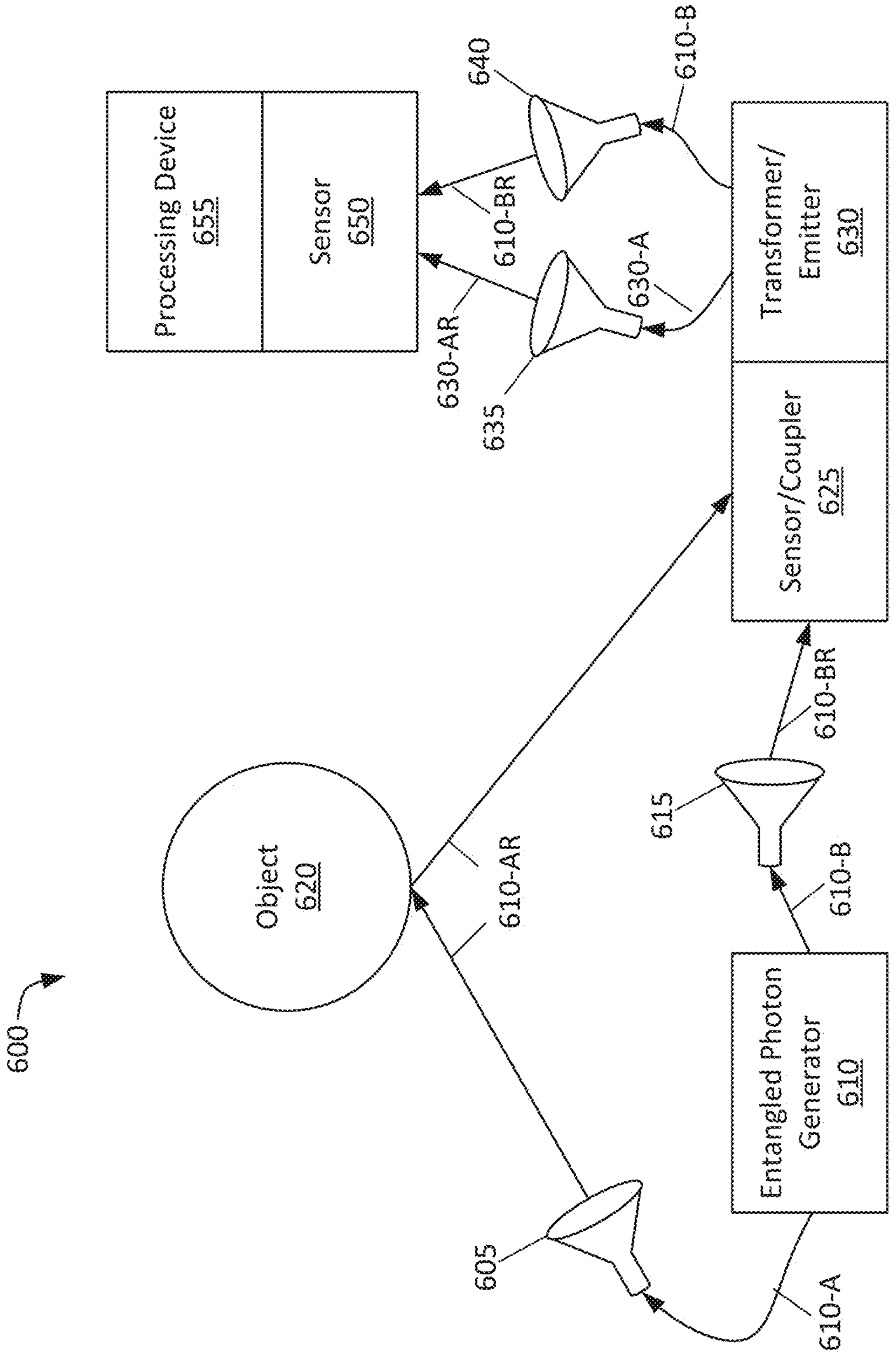
FIG. 6 illustrates a system that may include sensors for a network where reflected radiation is received by an adjacent sensor to improve sensitivity, in accordance with various aspects of the subject technology.

FIG. 6 illustrates a system that includes sensors for a network where reflected radiation is received by an adjacent sensor to improve sensitivity. Techniques used by the system 600 of FIG. 6 may use the effects of quantum illumination.

Entangled photons may be generated at photon source 610. Photon source 610 may split the entangled photons into a signal photon 610-A and idler photon 610-B. Alternatively or additionally, streams of signal photons 610-A and 610-B may be generated. This may include converting light photons 610-A and 610-B into respective RF photons in a manner similar to the technique discussed in respect to FIG. 3. As such, photons may be transmitted by elements 605 and 615 into an environment as a form of emitted electromagnetic radiation (e.g., photons 610-AR & 610-BR). This may result in photon(s) 610-A impacting and reflecting off object 620 toward sensor/coupler 625 as a form of radiation (e.g., one or more RF photons), as shown by arrows 610-AR. Photon(s) 610-BR may be transmitted to sensor/coupler 625.

In instances when sensor/coupler 625 compares photons 610-AR and 610-BR. This may include detecting the phase of a backscattered RF signal using an RF interferometer. Here a phase difference between the backscattered and reference RF photons (stream of photons) or signals may correspond to a distance to the object 620. In certain instances, sensor/coupler 625 may couple photons, amplify energy of those photons, and then provide those photons to be emitted via transformer/emitter 630. Alternately or additionally, photonic energy may be reflected and potentially amplified in a manner that focuses or directs one or more photons toward detector 650.

When entangled photon generator 610 includes semiconductor devices, channels used to propagate photons may act as waveguides and photons in the form of RF photons may be transmitted into space/the environment using an antenna (e.g., a microwave horn antenna or a miniature on-chip antenna). As such, transmitting elements 605, 615, 635, and 640 may be antennas that are coupled to silicon channels that form waveguides.

Another set of entangled photons 630-A and 630-B may be generated at entangled photon generator 630 and elements 635 and 640 may transmit those photons into space toward detector 650. The photons 630-A and 630-B may have the same relative state and phase information as photons 610-A and 610-B. State information may be maintained based on the operating principles of specific devices used to couple or transform photonic energy. In certain instances, photonic energy may be transformed from a first type to a second type of electromagnetic energy (e.g., from light to RF energy) and then from the second type to the first type of electromagnetic energy (e.g., from RF energy to light). Once received at detector 650, data associated with the entangled photons may be collected. A computer may evaluate this sensed data, for example, to generate mappings of subterranean structures.

In an example, a signal photon may be sent into an environment, while a related idler photon is retained at a sensing device. Reflections of the signal photon may be received and compared with the idler photon information such as (spin state and photon state). This may include comparing any reflection from the signal photon with the idler photon. This may result in improving improved signal-to-noise ratios (SNR) as compared to using apparatus that do not utilize quantum effects. This may be particularly beneficial in challenging environments like a wellbore environment. By leveraging quantum phenomena, quantum sensors can achieve a high degree of sensitivity and resolution, even while operating at incredibly low power levels.

The sensors described herein may also be used to form quantum networks. For example, entangled photons may be used for secure and efficient communication between one or more sensors. Quantum networks may exploit the principles of quantum mechanics to transfer information and sensors of the present disclosure may be used to share and relay data throughout the network. This may include using systems and techniques discussed herein with respect to the figures of the present disclosure. Quantum communication also has the potential advantage of security, as any attempt to intercept or alter the quantum data may be immediately detected. Such sensors may communicate by emitting RF radiation, creating a wireless sensor network within a region near a wellbore, for example.

Figure 7:
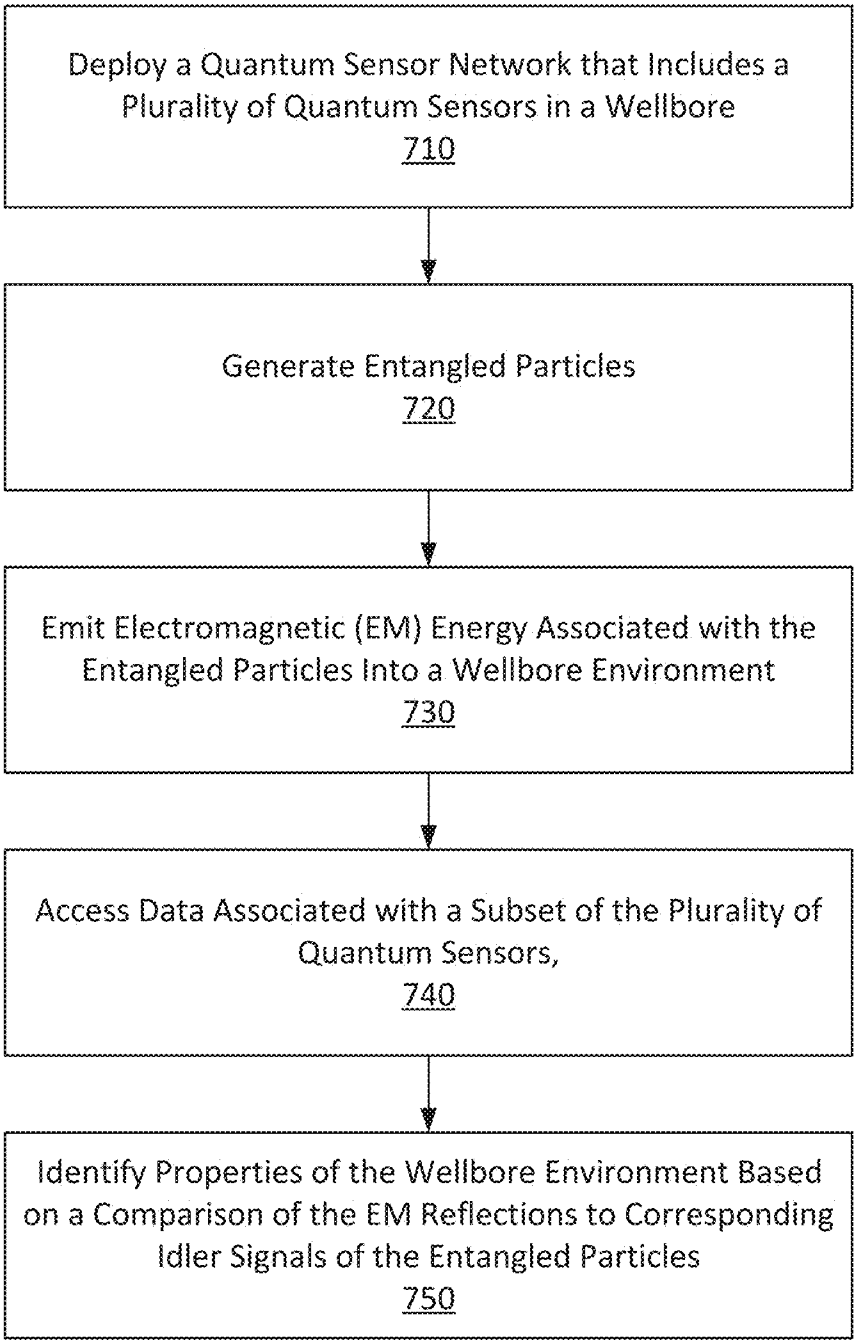
FIG. 7 illustrates actions that may be performed when a quantum sensor network is deployed and used in a wellbore, in accordance with various aspects of the subject technology.

FIG. 7 illustrates actions that may be performed when a quantum sensor network is deployed and used in a wellbore. At block 710 a quantum sensor or device network may be deployed in a wellbore. Each respective sensor or device of a plurality of different sensors/devices may be placed in the wellbore using techniques consistent with those discussed in respect to FIG. 4 where an existing wellbore is retrofitted or using techniques discussed above where quantum devices are deployed in a new wellbore. As such a plurality of devices could be deployed in an existing wellbore or in a new wellbore. At block 720, a device disposed in the wellbore may generate entangled particles. Electromagnetic energy (EM) associated with the entangled particles may be emitted into the wellbore environment (e.g., strata that surround the wellbore) at block 730. This may include generating a first photon (e.g., a "signal" photon) and a second photon (e.g., an "idler" photon), emitting the first photon, receiving reflections of the first photon, and comparing the first photon with the second photon. The first photon may have reflected off an object that is located around the wellbore and then back to a sensor as discussed in respect to FIG. 6.

Since the first photon and the second photon are entangled, their states (e.g., spin state and photon state) can be inverse to each other when they are detected. Any noise that affects the measurement process or the photons themselves, therefore, would affect each photon in a common yet opposite way. The effects of common mode noise may be removed based on knowledge that the states of the photons should be opposite using methods that are similar to providing inverse signals to a differential amplifier. As such, common mode noise affecting entangled photons may be removed based on application of differential filtering techniques to sets of received photons.

Data from sets of corresponding photons may be received and stored as data associated with sensors of a sensor network. This data may be indicative of the reflections of entangled particles off objects. At block 740 data associated with a subset of a plurality of quantum sensors or devices deployed in the wellbore may be accessed. For example, this data may be accessed by a computer that evaluates the data to identify properties (e.g., porosity, permeability, or other properties) of the wellbore as well as structures of the wellbore. Instructions of a computer model that describe relationships of matter may allow the computer to perform such evaluations. As such, at block 750, properties of the environment may be identified based on a comparison of the detected reflections of the electromagnetic radiation associated with the quantumly entangled particles to corresponding idler signals of the quantumly entangled particles.

Figure 8:
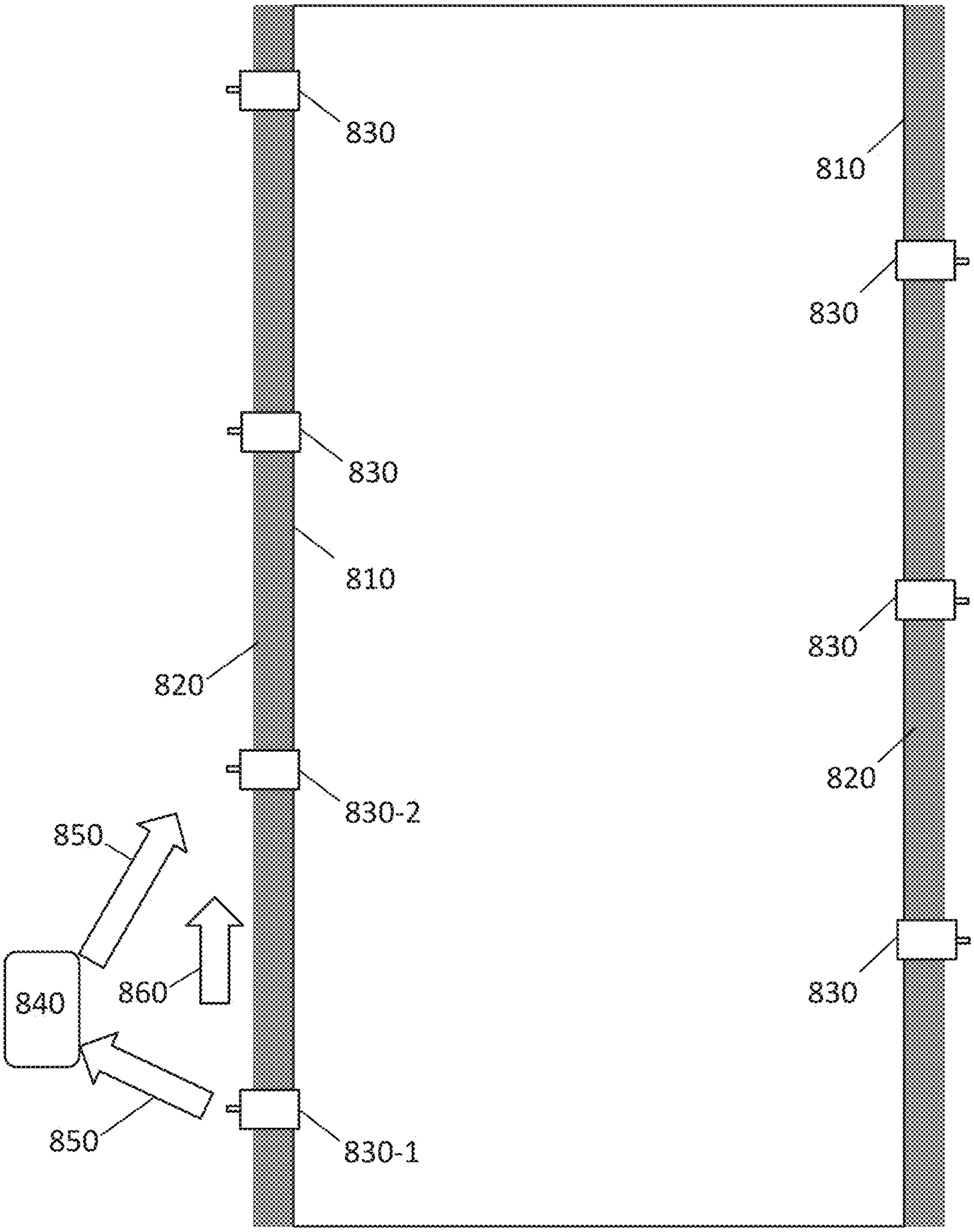
FIG. 8 illustrates a wellbore that has been equipped with quantum devices, in accordance with various aspects of the subject technology.

FIG. 8 illustrates a wellbore that has been equipped with quantum devices. FIG. 8 includes casing 810, cement 820, and quantum devices 830 (including quantum devices 830-1 and 830-2). The quantum devices 830 may have been attached using techniques discussed in respect to FIG. 4 above. The quantum device 830-1 at the lower left of FIG. 8 may generate entangled photons 850 and 860. As such quantum device 830-1 may include a laser that generates photons. These photons may be converted to RF photons using a structure that was discussed in respect to FIG. 3.

Photon 850 may propagate into subterranean strata near casing 810. Photon 850 may then impact and reflect off object 840 and may propagate toward quantum device 830-2. Photon 860 may propagate toward quantum device 830-2. Quantum device 830-2 may then receive, reflect, and/or sense photons 850 and 860. Data associated with photons 850 and 860 may be passed up the wellbore using apparatus as discussed in respect to FIGS. 2 and 6 via other quantum devices 830. Such data transmitted up the wellbore may be evaluated by a computer. As discussed in respect to FIG. 7, properties of the strata (e.g., object 840) near casing 810 may be identified.

Figure 9:
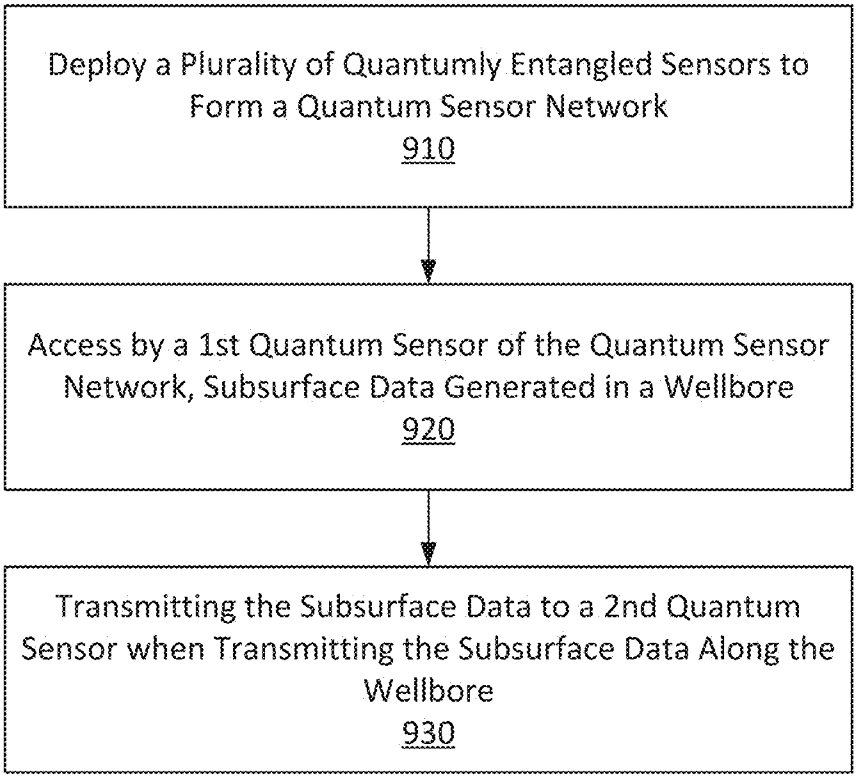
FIG. 9 illustrates actions that may be performed when a plurality of quantum sensors that are quantumly entangled form a quantum sensor network, in accordance with various aspects of the subject technology.

FIG. 9 illustrates actions that may be performed when a plurality of quantum sensors that are quantumly entangled form a quantum sensor network. At block 910, the plurality of deployed quantumly entangled sensors may be deployed along a portion of a wellbore (e.g., along a length of the wellbore). At block 920 a first quantum sensor in the network may access subsurface data that was generated downhole in the wellbore. This subsurface data may include data associated with entangled photons that reflected off an object as discussed in respect to FIGS. 6 and 8. At block 930, the subsurface data may then be transmitted to a second quantum sensor of the network when the subsurface data is being transmitted to a device at the surface (e.g., top portion) of the wellbore. In such an instance, the second quantum sensor may be closer to the surface of the wellbore than the first quantum sensor; and the subsurface data may be transmitted between the first quantum sensor and the second quantum sensor based on quantum entanglement between the first quantum sensor and the second quantum sensor.

The imaging capability of the quantum GPR becomes particularly valuable when monitoring the displacement of fluids within a reservoir. The fluids found in these reservoirs—oil, water, and carbon dioxide—each have distinct resistivity and dielectric properties, leading to significant contrasts between them. As these fluids move and displace each other within the reservoir, these contrasts can be detected and imaged by the quantum GPR. Techniques of the present disclosure allow for the ability to 'see' the movement of different fluids within the reservoir in real-time provides critical insights for processes such as enhanced oil recovery and carbon sequestration. It allows for efficient tracking and management of these processes, enabling operators to make informed decisions and optimize the utilization of the reservoir. As such computers evaluating data collected using quantum sensing may allow for the movement of fluids to be more accurately identified and tracked.

Harnessing the unique properties of quantum illumination and detection, systems of the present disclosure can accurately monitor and image the displacement of formation fluids, such as oil, water, and carbon dioxide, providing invaluable insights for enhanced oil recovery operations. Moreover, the sensor network's capacity for long-term, low-power operation can facilitate continued monitoring of carbon dioxide sequestration and storage efforts over decades, contributing significantly to global carbon management strategies.

In addition to four wave mixing, other methods may be used to down convert entangled optical frequencies to radio frequencies. Further, the various techniques may be used successively or in combination with each other in order to reach the desired radio frequency range. These other techniques that may be used include optical parametric oscillation, differential frequency generation, electro-optic modulation, and acousto-optic manipulation.

Optical parametric oscillation (OPO) is a process that occurs in nonlinear optical media and involves the conversion of a photon with higher energy into two photons with lower energy. The photon of higher frequency, known as the pump photon, is split into two photons: the signal photon and the idler photon. These two generated photons have a combined energy equal to the energy of the pump photon, thereby conserving energy. While the OPO process can typically generate photons in the infrared range, appropriate selection of the nonlinear medium and pump photon energy could potentially push the idler photon's frequency into the high radio frequency range. Also, the process can be repeated successively with nonlinear materials appropriate to each successive range in order to reach radio frequency range.

Difference frequency generation (DFG) is a nonlinear optical process that combines two input photons to generate an output photon with a frequency equal to the difference of the input frequencies. In a nonlinear optical medium, two laser beams with different frequencies overlap, generating a photon at the frequency difference. The output frequency can be tuned over a wide range by adjusting the frequencies of the input beams. Although typically used to generate mid-infrared light, DFG could be used to generate terahertz radiation, which is at the high end of the radio frequency range, by carefully selecting the input frequencies. The process may be repeated to reach lower radio frequencies.

Electro-optic modulation involves changing the frequency of light via the electro-optic effect, where an electric field modifies the optical properties of a medium. By applying a radio frequency electric field to an electro-optic crystal, the refractive index of the crystal is modulated at the radio frequency. When a laser beam passes through the modulated crystal, sidebands are created at frequencies offset from the laser frequency by the radio frequency. The power in these sidebands can be increased by resonating the radio frequency field, which can be used to effectively down convert optical frequencies to radio frequencies.

Acousto-optic modulation uses sound waves, rather than electric fields, to modulate the frequency of light. A sound wave launched into an acousto-optic material will produce a periodic modulation of the refractive index, creating a moving phase grating. When a laser beam is diffracted from this grating, its frequency can shift up or down depending on the direction of the sound wave. By using a high frequency sound wave, it's possible to shift the frequency of the light into the radio frequency range.

In addition to using radiofrequencies for sensing and telemetry, the native optical frequencies may be used for pressure, temperature, or spectroscopy. The radio frequencies may then be used for telemetry. Some examples of using the optical frequencies for native sensing include:

For pressure sensing: quantum sensors offer several advantages over traditional pressure sensing technologies, including resistance to electromagnetic interference, ability to operate in harsh environments, and high sensitivity.

For Fiber Bragg Grating (FBG) Sensors, a periodic variation of the refractive index is written into an optical fiber, which reflects a particular wavelength of light and transmits the rest. The reflected wavelength (Bragg wavelength) is sensitive to strain and temperature changes. By encapsulating the FBG in a material that expands and contracts with pressure, pressure changes can be inferred from changes in the Bragg wavelength.

Fabry-Pérot Interferometers (FPI) consists of two parallel reflective surfaces (mirrors) that create an interference pattern as light bounces between them. The interferometric pattern depends on the distance between the mirrors. In a pressure sensor, one mirror can be made flexible so that pressure changes deform the mirror and alter the interference pattern, thus indicating the pressure change.

Polarimetric pressure sensors are sensors where the pressure is inferred from changes in the polarization state of the light. The sensor is made of an optically anisotropic material whose optical properties change with pressure. As the pressure changes, the material alters the polarization state of the light traveling through it, which can be measured to infer the pressure.

Micro-Opto-Electro-Mechanical Systems (MOEMS) are miniaturized systems that combine mechanical, optical, and electrical components. In a MOEMS pressure sensor, pressure-induced mechanical deformation can change the optical path length or refractive index in a part of the system, causing a detectable change in the transmitted, reflected, or diffracted light.

Photonic crystal pressure sensors may also be used. Photonic crystals are structures with a periodic variation in refractive index, which gives them a photonic bandgap: a range of wavelengths that cannot propagate through the crystal. By designing a photonic crystal whose bandgap changes with pressure, a pressure sensor may be made.

Surface plasmon resonance (SPR) sensors may use surface plasmons that are collective oscillations of electrons at the interface between a metal and a dielectric. The resonance condition for exciting these surface plasmons is very sensitive to the properties of the materials involved, including pressure-induced changes. By monitoring the SPR condition, pressure changes can be detected.

Just as with pressure, there are numerous ways to measure temperature using optical frequencies. Many of these techniques leverage the sensitivity of certain optical properties to temperature. Below are a few examples that include fiber Bragg gratins, Raman scattering-based sensors, interferometric sensors, and photonic crystal temperature sensors.

For FBG sensors, similar to their application in pressure sensing, FBG sensors can be used to measure temperature. In this case, the Fiber Bragg Grating's refractive index and the grating period both change with temperature, resulting in a shift in the reflected Bragg wavelength. By monitoring this shift, the temperature change can be quantified.

For Raman scattering-based sensors, the scattered light frequency shifts due to the interaction with vibrational modes of molecules. Some of these modes are temperature dependent, so by analyzing the Raman scattered light, temperature can be inferred.

For interferometric sensors, such as those based on the Fabry-Pérot interferometer, use the temperature dependence of the refractive index. As the temperature changes, the refractive index changes, which in turn changes the interference pattern. This change can be used to measure temperature.

For photonic crystal temperature sensors, a photonic crystal whose bandgap is sensitive to temperature is used. A change in temperature leads to a change in the bandgap, which can be observed optically.

Often to measure either temperature or pressure, both will have to be measured in order to isolate the effect of the other. This can be done by using more than one physical principles as listed above, or with the same physical principle but with too differing configurations (i.e., materials or geometries). In this fashion, the effect of temperature may be deconvoluted from pressure and the effect of pressure deconvoluted from temperature.

Optical frequencies are also useful for material composition. Optical spectroscopy offers a plethora of techniques for measuring the composition of a substance:

For absorption spectroscopy, this technique measures the absorption of light as it passes through a sample. Different substances absorb different wavelengths of light, producing characteristic absorption spectra.

For transmission spectroscopy, this method involves measuring the intensity of light transmitted through a sample at various wavelengths. The transmission spectrum can provide information about the substance's composition.

Reflectance spectroscopy involves measuring the light that is reflected off a sample. The reflectance spectrum can provide information about the sample's surface composition.

Raman spectroscopy measures the scattering of light off a sample. Some of the scattered light undergoes a shift in wavelength due to interactions with the sample, producing a Raman spectrum that can provide information about the sample's composition.

Fourier transform infrared (FTIR) Spectroscopy is a type of absorption spectroscopy that uses infrared light. It can provide detailed information about the chemical bonds and molecular structures in a sample.

Fluorescence spectroscopy involves measuring the light that a sample emits after it absorbs light. The fluorescence spectrum can provide information about the types of molecules in the sample.

Ultraviolet-Visible (UV-Vis) spectroscopy is another type of absorption spectroscopy that uses ultraviolet and visible light. It is commonly used to study organic and inorganic compounds.

Comb spectroscopy, which is also known as frequency comb spectroscopy, uses a laser source that emits at a multitude of frequencies simultaneously usually as produced by a ring resonator. These frequencies are equally spaced (much like the teeth of a comb), hence the name. This precise, regular frequency spacing allows for high-resolution and high-speed spectroscopic measurements. Each "tooth" of the frequency comb can interact with different transitions in a sample, providing a broad, high-resolution spectrum. The main advantage of frequency comb spectroscopy is its exceptional accuracy and precision, stemming from the inherent stability and regularity of the comb.

Dual-comb spectroscopy is an advanced form of comb spectroscopy where two slightly different frequency combs are used. The difference in their frequency spacing results in a "beating" effect when the two combs overlap. This beating can be detected and measured, effectively down converting the optical frequencies to radio frequencies that can be handled by standard electronic equipment. It's somewhat like performing a Fourier Transform (FT), thus it's sometimes described as a pseudo FTIR method. Dual-comb spectroscopy combines the advantages of high precision from comb spectroscopy and high speed from Fourier Transform techniques. It can provide very detailed spectral information extremely quickly, making it particularly useful for applications where conditions change rapidly, like combustion analysis or atmospheric monitoring.

For temperature, pressure or spectroscopy applications, the placement may be placed a few feet to a few tens of feet from the wellbore using a small (i.e., ⅛" to 1/16") flexible wire drill that may be used to drill the hold discussed in respect to FIG. 4. This may also allow a tomography of the nearby wellbore region.

Semiconductor lasers, also known as laser diodes, have a wide range of operating temperatures depending on the specific materials and construction. However, in general, these devices are sensitive to temperature changes, which can affect their output power, wavelength, efficiency, and lifetime. Nonetheless, some types of semiconductor lasers can handle relatively high operating temperatures and are designed specifically for harsh environments:

Gallium nitride (GaN) lasers, such as those emitting in the blue and ultraviolet range, are known for their relatively high temperature operation. As a diode operation up to 400 deg C. has been demonstrated.

Aluminum gallium indium phosphide (AlGaInP) lasers, which typically emit red light, can operate at higher temperatures and are used in optical communications and industrial applications. making them especially compatible with standard telecom fiber optics and quite a bit of photonic chip development. Operation up to 125 deg C. has been demonstrated.

Quantum dot lasers have been shown to be very robust with temperature demonstrations up to 220 deg C. The quantum dot lasers operate over a very large wavelength range and have been demonstrated to be able to be integrated with photonic chips.

For all these applications, even if the device may operate at high temperature, temperature stability is crucial. Temperature stability may only need be achieved for certain critical components of the photonic chip such as the semiconductor material, laser cavity and vacuum squeezed portion and down converting resonators. In the present embodiment, the chip would be designed for use at specific temperatures or selected from a batch process that has a distribution of optimal temperatures around the temperature of the intended use. The direct components on the chip that require thermal stability may be locally controlled by a variety of means. The temperature may be controlled to above reservoir temperature by introducing a bit of energy into the local regions. A thermal pipe may conduct the heat from a local heat source such as the battery or other convenient junction. The thermal conductivity of that path may be adjusted. Alternatively, or additionally, the distance of the thermal pipe may be adjusted to the sensitive chip region. The chip may be made of a highly thermally insulative material, or locally thermally isolated. The distance may be adjusted automatically as a function of the ambient temperature of that region by use of a shape adjusting material that changes shape with temperature. This may simply include linear distance or radial distance adjustments. Radioactive materials may also be a local source. An active heat source may be deployed locally, utilizing some of the locally harvested power, or battery power. A radioactive source may directly coat the portion of the chip that needs to be temperature controlled. Heat may then be taken away from the zone and controlled by a preferably natural thermostat such as that of a conductive heat sink's proximity controlled by a thermally shape changing material including one that is controlled by thermal expansion. The control of the temperature may also be achieved by a gas that is released within the thermal zone by a getter material that is tuned to release gas near the operational temperature in order to keep the components at that temperature. MEMs devices also reflect warming radiation at the active areas naturally as a consequence of the environmental temperature. The Mems devices may be tuned to direct radiation when the temperature is too low and redirect when the temperature is too high. A semi-transparent material with that changes the reflectivity as a function of wavelength with temperature may also be used to naturally direct warming radiation to components.

Systems and techniques of the present disclosure have many different potential use cases. Such use cases include, waterflood monitoring for controlling reservoir production or completing wellbores intelligently, wireless/contactless telemetry for intelligent wellbore completion, and pressure/temperature sensing arrays.

Regarding waterflood monitoring for intelligent wellbore completion: The injection of water is a common method to enhance the recovery of hydrocarbons from a reservoir. This may be achieved by injecting water into dedicated Injector Wells and recovering hydrocarbons out of separate Producer Wells. One potential challenge with water injection is that, without management, there is potential for water to breakthrough into a Producer Well. Such breakthrough is undesirable as it will cause water to flow to the surface in the Producer Well. This not only introduces an inefficiency to the Producer Well, but it also leaves the customer with contaminated water which has to be treated prior to disposal.

The ability to monitor the propagation of water from Injector Wells towards Producer Wells would allow the operator to optimize their water injection activities to remove or reduce the potential for water breakthrough. This would be highly valuable to maximize the hydrocarbon recovery for a reservoir and minimize the amount of produced water that needs to be handled.

Electromagnetic techniques could potentially be used to monitor the movement of water in a reservoir. However, traditional techniques are expected to require relatively high power in the context of what can feasibly be provided within a permanent completion. The techniques described in this document are expected to significantly reduce the power requirements while providing a depth of measurement which is comparable to traditional techniques.

This technology could also be applicable to other enhanced recover techniques, such as Gas Injection.

Regarding wireless telemetry for intelligent wellbore completion: Intelligent completions typically use wired telemetry to transfer data between the surface and downhole devices (such as permanent downhole gauges.) In most cases, this is achieved by attaching a Tubing Encapsulated Conductor (TEC) to the outside of the production tubing in the well. This requires additional time to deploy the production tubing and presents a risk of the telemetry failing due to damage during to deployment or issues such as fluid/gas ingress during the life of the completion.

A number of technologies exist which could be used for wireless telemetry, but the power requirements of these typically mean that they have to be battery powered and have a limited lifetime. The technology described in this document could be used to create a linear network of nodes. Each node would require a low enough power that would enable the use of energy harvesting or the use of miniature power sources (such as a nuclear battery) whilst providing long battery lives.

A Quantum wireless telemetry could enable miniature nodes to be pre-installed within production tubing (or casing). This would allow the telemetry system to be deployed without adding any additional run-in hole time that is typically associated with TEC deployment.

Currently, TEC may be used to transfer power downhole and provide communication. The technology described in this document will address the need for communication but may not provide a way to transfer power downhole. The same technologies could potentially enable the creation of low power pressure/temperature sensors which can be self-powered (e.g., via energy harvesting). Alternatively, higher power devices could be powered by more traditional power generation methods such as turbines if such devices are only required to function when the well is flowing.

Regarding Pressure/Temperature Sensing Arrays, a number of technologies exist which provide a means for multipoint temperature and pressure monitoring in an intelligent wellbore completion. Such technologies typically rely on a number of discrete sensors which are connected to a TEC for power and communication to surface or make use of fiber optics for distributed sensing. In either case, a fiber or TEC is required to be run down the completion which adds to the deployment time and introduces potential failure modes.

Extending on the wireless telemetry mentioned in the previous section, the addition of pressure/temperature sensing to each wireless node would allow a network of sensors to be created along the length of the completion.

Regarding contactless telemetry connection within an Intelligent wellbore completion: There are a number of points within an Intelligent Completion where the ability to have a contactless connection would be useful. Examples include—Interfacing between different strings of a wellbore (e.g., a multilateral string and a main bore string)—Interfacing between an upper completion portion of a wellbore and lower completion portion of the wellbore (e.g., where it is necessary to replace the upper completion and restore communication with the lower completion afterwards)—Interfacing between a components of a tubing string (a tube apparatus designed to transfer fluids) and a device that makes pressure (e.g., pressure gauge) that may be installed on completion of the wellbore.

The technology described in this disclosure may allow communications to pass between the aforementioned connection points. As mentioned in the previous section, other complementary technologies could be used to address the need for power in these locations.

Figure 10:
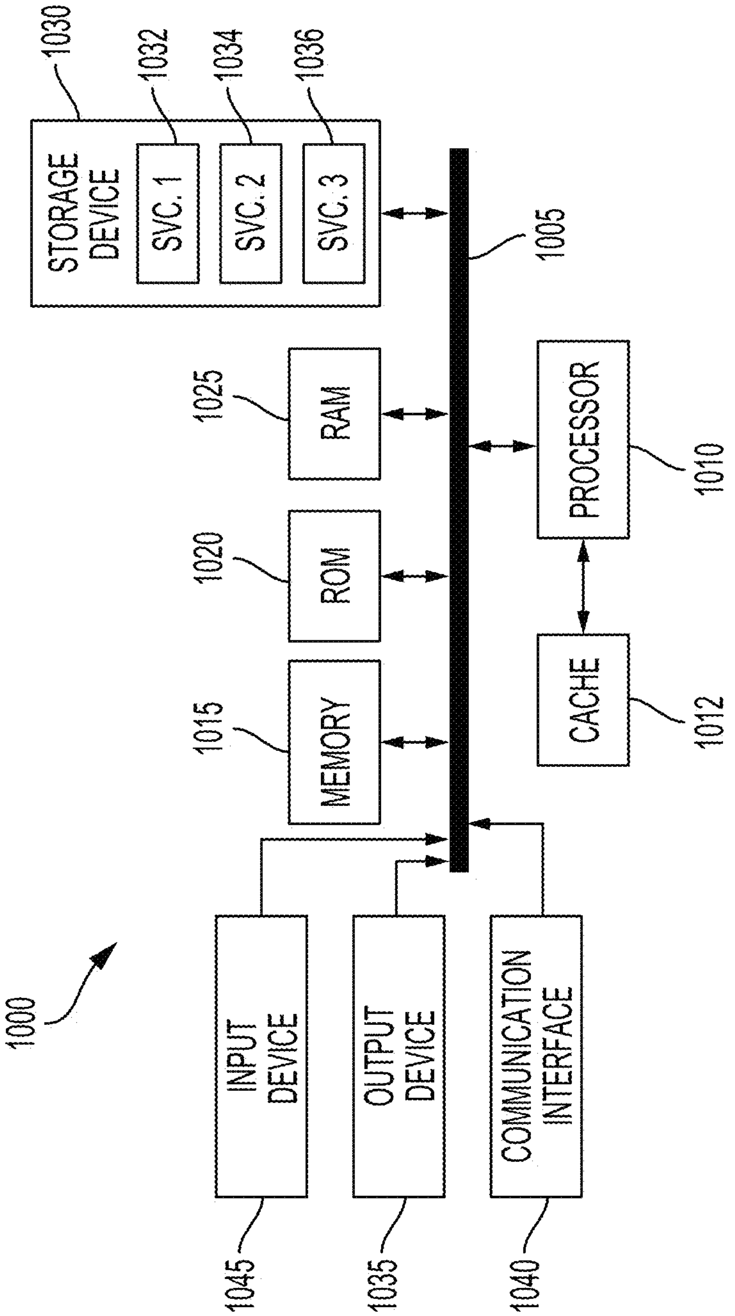
FIG. 10 illustrates an example computing device architecture which can be employed to perform various steps, methods, and techniques disclosed herein.

FIG. 10 illustrates an example computing device architecture 1000 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 10 illustrates an example computing device architecture 1000 of a computing device which can implement the various technologies and techniques described herein. The components of the computing device architecture 1000 are shown in electrical communication with each other using a connection 1005, such as a bus. The example computing device architecture 1000 includes a processing unit (CPU or processor) 1010 and a computing device connection 1005 that couples various computing device components including the computing device memory 1015, such as read only memory (ROM) 1020 and random access memory (RAM) 1025, to the processor 1010.

The computing device architecture 1000 can include a cache of high-speed memory connected directly with, in close proximity to, or integrated as part of the processor 1010. The computing device architecture 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other computing device memory 1015 may be available for use as well. The memory 1015 can include multiple different types of memory with different performance characteristics. The processor 1010 can include any general purpose processor and a hardware or software service, such as service 1 1032, service 2 1034, and service 3 1036 stored in storage device 1030, configured to control the processor 1010 as well as a special-purpose processor where software instructions are incorporated into the processor design. The processor 1010 may be a self-contained system, containing multiple cores or processors, a bus, memory controller, cache, etc. A multi-core processor may be symmetric or asymmetric.

To enable user interaction with the computing device architecture 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art, such as a display, projector, television, speaker device, etc. In some instances, multimodal computing devices can enable a user to provide multiple types of input to communicate with the computing device architecture 1000. The communications interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. The storage device 1030 can include services 1032, 1034, 1036 for controlling the processor 1010. Other hardware or software modules are contemplated. The storage device 1030 can be connected to the computing device connection 1005. In one aspect, a hardware module that performs a particular function can include the software component stored in a computer-readable medium in connection with the necessary hardware components, such as the processor 1010, connection 1005, output device 1035, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1. A method comprising: deploying, within a wellbore, a quantum sensor comprising a quantum source configured to generate quantumly entangled particles while disposed within the wellbore; and emit electromagnetic radiation associated with the quantumly entangled particles into an environment associated with the wellbore; accessing data indicative of detected reflections of the electromagnetic radiation associated with the quantumly entangled particles; and identifying properties of the environment based on a comparison of the detected reflections of the electromagnetic radiation associated with the quantumly entangled particles to corresponding idler signals of the quantumly entangled particles.

Statement 2. The method of statement 1, wherein the quantum sensor further comprises a quantum detector configured to capture the data indicative of detected reflections of the electromagnetic radiation associated with the quantumly entangled particles.

Statement 3. The method of statement 2, wherein the quantum detector is configured to detect the reflections of the electromagnetic radiation through defect centers in crystal lattices of the quantum detector.

Statement 4: The method of any of statements 1 through 3, wherein the quantum sensor is deployed into the wellbore after a completion phase of the wellbore.

Statement 5: The method of any of statements 1 through 4, wherein the quantum sensor is deployed into the wellbore during a completion phase of the wellbore.

Statement 6: The method of any of statements 1 through 5, wherein the quantum sensor is configured to operate at a power between 100 and 150 nanowatts.

Statement 7: The method of any of statements 1 through 6, wherein the quantum sensor is configured to operate entirely from power that is harvested in situ in the wellbore through a power harvesting device disposed in the wellbore.

Statement 8: The method of any of statements 1 through 7, wherein the quantum sensor operates within a signal-to-noise ratio that is based on an ability to discriminate the detected reflections of the electromagnetic radiation associated with the quantumly entangled particles from detected electromagnetic radiation that is not associated with the quantumly entangled particles.

Statement 9: The method of any of statements 1 through 8, wherein the quantum sensor is further configured to: generate the quantumly entangled particles in an optical frequency range; and down convert the quantumly entangled particles from the optical frequency range to a radio frequency range to generate the electromagnetic radiation associated with the quantumly entangled particles in the radio frequency range.

Statement 10: The method of statement 9, wherein the quantum sensor is configured to generate the quantumly entangled particles in the optical frequency range through one or more on-chip nanowatt lasers operating with a squeezing mechanism.

Statement 11: The method of any of statements 9 and 10, wherein the quantum sensor is configured to down convert the quantumly entangled particles to generate the electromagnetic radiation associated with the quantumly entangled particles in the radio frequency range through a dual ring cavity that implements four wave mixing.

Statement 12: The method of any of statements 9 through 11, wherein the quantum sensor is configured to down convert the quantumly entangled particles to generate the electromagnetic radiation associated with the quantumly entangled particles in the radio frequency range through one of optical parametric oscillation, difference frequency generation, electro-optic modulation, and acousto-optic modulation.

Statement 13: The method of any of statements 9 through 12, wherein the quantum sensor is configured to down convert the quantumly entangled particles to generate the electromagnetic radiation associated with the quantumly entangled particles in the radio frequency range through optical parametric oscillation.

Statement 14: The method of any of statements 1 through 13, wherein the environment is a formation surrounding the wellbore and the properties of the environment represent an image of the formation.

Statement 15: The method of any of statements 1 through 14, wherein the properties of the environment include either or both pressure and temperature measurements in the environment.

Statement 16: The method of any of statements 1 through 15, wherein the environment is a formation surrounding the wellbore, the wellbore is a producer well, and the properties of the environment include movement of water in the formation that is injected into the formation through an injector well in proximity to the producer well. Statement 17: A quantum sensor comprising: a quantum source configured to: generate quantumly entangled particles while disposed within a wellbore; and emit electromagnetic radiation associated with the quantumly entangled particles into an environment associated with a wellbore into which the quantum sensor is deployed; and a detector configured to generate data indicative of detect reflections of the electromagnetic radiation associated with the quantumly entangled particles for comparison to idler signals of the quantumly entangled particles to determine properties of the environment based on the comparison. The properties of the environment may include properties associated with carbon dioxide ($CO_2$) in a carbon storage well.

Statement 18: The quantum sensor of statement 17, wherein the quantum sensor is anchored through a casing of the wellbore during either a completion of the wellbore or after the completion of the wellbore.

Statement 19: The quantum sensor of statement 18, wherein a base of the quantum sensor that anchors the quantum sensor through the casing of the wellbore is coated, at least in part, through a curing ceramic material.

Statement 20: A system comprising: a quantum sensor comprising: a quantum source configured to: generate quantumly entangled particles while disposed within a wellbore; and emit electromagnetic radiation associated with the quantumly entangled particles into an environment associated with a wellbore into which the quantum sensor is deployed; a detector configured to generate data indicative of detect reflections of the electromagnetic radiation associated with the quantumly entangled particles for comparison to idler signals of the quantumly entangled particles to determine properties of the environment based on the comparison; one or more processors; and at least one computer-readable storage medium having stored therein instructions which, when executed by the one or more processors, cause the one or more processors to: access the data indicative of detected reflections of the electromagnetic radiation associated with the quantumly entangled particles; and identify properties of the environment based on a comparison of the detected reflections of the electromagnetic radiation associated with the quantumly entangled particles to corresponding idler signals of the quantumly entangled particles.

Statement 21: A method comprising: deploying, within a wellbore, a quantum sensor network comprising a plurality of quantum sensors, wherein the plurality of quantum sensors are configured to: generate quantumly entangled particles while disposed within the wellbore; and emit electromagnetic radiation associated with the quantumly entangled particles into an environment associated with the wellbore; accessing data indicative of detected reflections of the electromagnetic radiation associated with the quantumly entangled particles across at least a subset of the plurality of quantum sensors; and identifying properties of the environment based on a comparison of the detected reflections of the electromagnetic radiation associated with the quantumly entangled particles to corresponding idler signals of the quantumly entangled particles.

Statement 22: The method of statement 21, wherein each quantum sensor in the plurality of quantum sensors comprises a detector configured to detect the reflections of the electromagnetic radiation that is emitted by other quantum sensors of the plurality of quantum sensors, thereby forming the quantum sensor network.

Statement 23: The method of any of statements 21 and 22, wherein the quantum sensor network forms a distributed sensor network that is interconnected wirelessly and without a wired connection.

Statement 24: The method of any of statements 21 through 23, wherein the quantum sensor network is deployed into the wellbore after a completion phase of the wellbore.

Statement 25: The method of any of statements 21 through 24, wherein the quantum sensor network is deployed into the wellbore during a completion phase of the wellbore.

Statement 26: The method of any of statements 21 through 25, wherein each quantum sensor of the plurality of quantum sensors is configured to operate at a power between 100 and 150 nanowatts.

Statement 27: The method of any of statements 21 through 26, wherein each quantum sensor of the plurality of quantum sensors is configured to operate entirely from power that is harvested in situ in the wellbore through a power harvesting device disposed in the wellbore.

Statement 28: The method of any of statements 21 through 27, wherein each quantum sensor of the plurality of quantum sensors operates within a signal-to-noise ratio that is based on an ability to discriminate the detected reflections of the electromagnetic radiation associated with the quantumly entangled particles from detected electromagnetic radiation that is not associated with the quantumly entangled particles.

Statement 29: The method of any of statements 21 through 28, wherein each quantum sensor of the plurality of quantum sensors is further configured to: generate the quantumly entangled particles in an optical frequency range; and down convert the quantumly entangled particles from the optical frequency range to a radio frequency range to generate the electromagnetic radiation associated with the quantumly entangled particles in the radio frequency range.

Statement 30: The method of statement 29, wherein each quantum sensor of the plurality of quantum sensors is configured to generate the quantumly entangled particles in the optical frequency range through one or more on-chip nanowatt lasers operating with a squeezing mechanism.

Statement 31: The method of any of statements 29 and 30, wherein each quantum sensor of the plurality of quantum sensors is configured to down convert the quantumly entangled particles to generate the electromagnetic radiation associated with the quantumly entangled particles in the radio frequency range through a dual ring cavity that implements four wave mixing.

Statement 32: The method of any of statements 29 through 31, wherein each quantum sensor of the plurality of quantum sensors is configured to down convert the quantumly entangled particles to generate the electromagnetic radiation associated with the quantumly entangled particles in the radio frequency range through one of optical parametric oscillation, difference frequency generation, electro-optic modulation, and acousto-optic modulation.

Statement 33: The method of any of statements 29 through 32, wherein each quantum sensor of the plurality of quantum sensors is configured to down convert the quantumly entangled particles to generate the electromagnetic radiation associated with the quantumly entangled particles in the radio frequency range through optical parametric oscillation.

Statement 34: The method of any of statements 21 through 33, wherein the environment is a formation surrounding the wellbore and the properties of the environment represent an image of the formation.

Statement 35: The method of any of statements 21 through 34, wherein the properties of the environment include either or both pressure and temperature measurements in the environment.

Statement 36: The method of any of statements 21 through 35, wherein the environment is a formation surrounding the wellbore, the wellbore is a producer well, and the properties of the environment include movement of water in the formation that is injected into the formation through an injector well in proximity to the producer well.

Statement 37: A quantum sensor network comprising: a first quantum sensor configured to: generate quantumly entangled particles while disposed within the wellbore; and emit electromagnetic radiation associated with the quantumly entangled particles into an environment associated with the wellbore; and a second quantum sensor operationally coupled to the first quantum sensor and configured to detect reflections of the electromagnetic radiation associated with the quantumly entangled particles that is emitted by the first quantum sensor, wherein properties of the wellbore can be identified based on a comparison of the detected reflections of the electromagnetic radiation associated with the quantumly entangled particles to corresponding idler signals of the quantumly entangled particles.

Statement 38: The quantum sensor network of statement 37, wherein the quantum sensor is anchored through a casing of the wellbore during either a completion of the wellbore or after the completion of the wellbore.

Statement 39: The quantum sensor network of statement 38, wherein a base of the quantum sensor that anchors the quantum sensor through the casing of the wellbore is coated, at least in part, through a curing ceramic material.

Statement 40: A system comprising: a quantum sensor network comprising a plurality of quantum sensors configured to: generate quantumly entangled particles while disposed within a wellbore; emit electromagnetic radiation associated with the quantumly entangled particles into an environment associated with a wellbore into which the quantum sensor is deployed; generate data indicative of detect reflections of the electromagnetic radiation associated with the quantumly entangled particles for comparison to idler signals of the quantumly entangled particles to determine properties of the environment based on the comparison; one or more processors; and at least one computer-readable storage medium having stored therein instructions which, when executed by the one or more processors, cause the one or more processors to: access the data indicative of detected reflections of the electromagnetic radiation associated with the quantumly entangled particles; and identify properties of the environment based on a comparison of the detected reflections of the electromagnetic radiation associated with the quantumly entangled particles to corresponding idler signals of the quantumly entangled particles.

Statement 41: A method comprising: deploying, along a portion of a length of a wellbore, a plurality of quantum sensors that are quantumly entangled with each other to form a quantum sensor network of quantumly entangled sensors; accessing by a first quantum sensor in the network of quantum sensors subsurface data that is generated downhole in the wellbore; and transmitting the subsurface data to a second quantum sensor in the network of quantum sensors as part of transmitting the subsurface data toward a surface of the wellbore, wherein: the second quantum sensor is closer to the surface of the wellbore than the first quantum sensor; and the subsurface data is transmitted between the first quantum sensor and the second quantum sensor based on quantum entanglement between the first quantum sensor and the second quantum sensor.

Statement 42: The method of statement 41, wherein each quantum sensor in the plurality of quantum sensors comprises a detector configured to detect the electromagnetic radiation that is emitted by other quantum sensors of the plurality of quantum sensors, thereby forming the quantum sensor network.

Statement 43: The method of statement 42, wherein the detector is a quantum detector.

Statement 44: The method of any of statements 41 through 43, wherein the quantum sensor network is deployed into the wellbore after a completion phase of the wellbore.

Statement 45: The method of any of statements 41 through 44, wherein the quantum sensor network is deployed into the wellbore during a completion phase of the wellbore.

Statement 46: The method of any of statements 41 through 45, wherein each quantum sensor of the plurality of quantum sensors is configured to operate at a power between 100 and 150 nanowatts.

Statement 47: The method of any of statements 41 through 46, wherein each quantum sensor of the plurality of quantum sensors is configured to operate entirely from power that is harvested in situ in the wellbore through a power harvesting device disposed in the wellbore.

Statement 48: The method of any of statements 41 through 47, wherein each quantum sensor of the plurality of quantum sensors operates within a signal-to-noise ratio that is based on an ability to discriminate the detected electromagnetic radiation associated with the quantumly entangled particles from detected electromagnetic radiation that is not associated with the quantumly entangled particles.

Statement 49: The method of any of statements 41 through 48, wherein each quantum sensor of the plurality of quantum sensors is further configured to: generate the quantumly entangled particles in an optical frequency range; and down convert the quantumly entangled particles from the optical frequency range to a radio frequency range to generate the electromagnetic radiation associated with the quantumly entangled particles in the radio frequency range.

Statement 50: The method of statement 49, wherein each quantum sensor of the plurality of quantum sensors is configured to generate the quantumly entangled particles in the optical frequency range through one or more on-chip nanowatt lasers operating with a squeezing mechanism.

Statement 51: The method of any of statements 49 and 50, wherein each quantum sensor of the plurality of quantum sensors is configured to down convert the quantumly entangled particles to generate the electromagnetic radiation associated with the quantumly entangled particles in the radio frequency range through a dual ring cavity that implements four wave mixing.

Statement 52: The method of any of statements 49 through 51, wherein each quantum sensor of the plurality of quantum sensors is configured to down convert the quantumly entangled particles to generate the electromagnetic radiation associated with the quantumly entangled particles in the radio frequency range through one of optical parametric oscillation, difference frequency generation, electro-optic modulation, and acousto-optic modulation.

Statement 53: The method of any of statements 49 through 52, wherein each quantum sensor of the plurality of quantum sensors is configured to down convert the quantumly entangled particles to generate the electromagnetic radiation associated with the quantumly entangled particles in the radio frequency range through optical parametric oscillation.

Statement 54: The method of any of statements 41 through 53, wherein the environment is a formation surrounding the wellbore and the properties of the environment represent an image of the formation.

Statement 55: The method of any of statements 41 through 54, wherein the properties of the environment include either or both pressure and temperature measurements in the environment.

Statement 56: The method of any of statements 41 through 55, wherein the environment is a formation surrounding the wellbore, the wellbore is a producer well, and the properties of the environment include movement of water in the formation that is injected into the formation through an injector well in proximity to the producer well.

Statement 57: A quantum sensor network comprising: a first quantum sensor quantumly entangled with a second quantum sensor that are disposed in a wellbore to form a quantum sensor network of quantumly entangled sensors in the wellbore, wherein the first quantum sensor is configured to: access subsurface data that is generated downhole in the wellbore; and transmit the subsurface data to a second quantum sensor in the network of quantum sensors as part of transmitting the subsurface data toward a surface of the wellbore; and the second quantum sensor is configured to receive the subsurface data that is transmitted by the first quantum sensor based on quantum entanglement between the first quantum sensor and the second quantum sensor, wherein the second quantum sensor is closer to the surface of the wellbore than the first quantum sensor.

Statement 58: The quantum sensor network of statement 57, wherein the first quantum sensor and the second quantum sensor are anchored through a casing of the wellbore during either a completion of the wellbore or after the completion of the wellbore.

Statement 59: The quantum sensor network of statement 58, wherein a base of either or both the first quantum sensor and the second quantum sensor is coated, at least in part, through a curing ceramic material.

Statement 60: A system comprising: a quantum sensor network comprising: a first quantum sensor quantumly entangled with a second quantum sensor disposed in a wellbore to form a quantum sensor network of quantumly entangled sensors within the wellbore, wherein the first quantum sensor is configured to: access subsurface data that is generated downhole in the wellbore; and transmit the subsurface data to a second quantum sensor in the network of quantum sensors as part of transmitting the subsurface data toward a surface of the wellbore; and the second quantum sensor is configured to receive the subsurface data that is transmitted by the first quantum sensor based on quantum entanglement between the first quantum sensor and the second quantum sensor, wherein the second quantum sensor is closer to the surface of the wellbore than the first quantum sensor; and at least one computer-readable storage medium having stored therein instructions which, when executed by the one or more processors, cause the one or more processors to: access the subsurface data indicative of detected reflections of electromagnetic radiation associated with the quantumly entangled particles; and identify properties of an environment in the wellbore based on a comparison of the detected reflections of the electromagnetic radiation associated with the quantumly entangled particles to corresponding idler signals of the quantumly entangled particles.

What is claimed is:

1. A method comprising:
- deploying, within a wellbore, a quantum sensor comprising a quantum source configured to:
  - generate quantumly entangled particles while the quantum sensor is disposed within the wellbore; and
  - emit electromagnetic radiation associated with the quantumly entangled particles from a first location in the wellbore to a second location disposed into a subterranean strata, wherein the second location is disposed outside the wellbore;
- accessing data indicative of detected reflections of the electromagnetic radiation associated with the quantumly entangled particles; and
- identifying properties of the environment based on a comparison of the detected reflections of the electromagnetic radiation associated with the quantumly entangled particles to corresponding idler signals of the quantumly entangled particles.

2. The method of claim 1, wherein the quantum sensor further comprises a quantum detector configured to capture the data indicative of detected reflections of the electromagnetic radiation associated with the quantumly entangled particles.

3. The method of claim 2, wherein the quantum detector is configured to detect the reflections of the electromagnetic radiation through defect centers in crystal lattices of the quantum detector.

4. The method of claim 1, wherein the quantum sensor is deployed into the wellbore after a completion phase of the wellbore.

5. The method of claim 1, wherein the quantum sensor is deployed into the wellbore during a completion phase of the wellbore.

6. The method of claim 1, wherein the quantum sensor is configured to operate at a power between 100 and 150 nanowatts.

7. The method of claim 1, wherein the quantum sensor is configured to operate entirely from power that is harvested in situ in the wellbore through a power harvesting device disposed in the wellbore.

8. The method of claim 1, wherein the quantum sensor operates within a signal-to-noise ratio that is based on an ability to discriminate the detected reflections of the electromagnetic radiation associated with the quantumly entangled particles from detected electromagnetic radiation that is not associated with the quantumly entangled particles.

9. The method of claim 1, wherein the quantum sensor is further configured to:
- generate the quantumly entangled particles in an optical frequency range; and
- down convert the quantumly entangled particles from the optical frequency range to a radio frequency range to generate the electromagnetic radiation associated with the quantumly entangled particles in the radio frequency range.

10. The method of claim 9, wherein the quantum sensor is configured to generate the quantumly entangled particles in the optical frequency range through one or more on-chip nanowatt lasers operating with a squeezing mechanism.

11. The method of claim 9, wherein the quantum sensor is configured to down convert the quantumly entangled particles to generate the electromagnetic radiation associated with the quantumly entangled particles in the radio frequency range through a dual ring cavity that implements four wave mixing.

12. The method of claim 9, wherein the quantum sensor is configured to down convert the quantumly entangled particles to generate the electromagnetic radiation associated with the quantumly entangled particles in the radio frequency range through one of optical parametric oscillation, difference frequency generation, electro-optic modulation, and acousto-optic modulation.

13. The method of claim 9, wherein the quantum sensor is configured to down convert the quantumly entangled particles to generate the electromagnetic radiation associated with the quantumly entangled particles in the radio frequency range through optical parametric oscillation.

14. The method of claim 1, wherein the environment is a formation surrounding the wellbore and the properties of the environment represent an image of the formation.

15. The method of claim 1, wherein the properties of the environment include either or both pressure and temperature measurements in the environment.

16. The method of claim 1, wherein the environment is a formation surrounding the wellbore, the wellbore is a producer well, and the properties of the environment include movement of water in the formation that is injected into the formation through an injector well in proximity to the producer well.

17. A quantum sensor comprising:

a quantum source configured to:

generate quantumly entangled particles while the quantum sensor is disposed within a wellbore; and emit electromagnetic radiation associated with the quantumly entangled particles from a first location in the wellbore to a second location disposed in a subterranean strata, wherein the second location is disposed outside the wellbore; and a detector configured to generate data indicative of detect reflections of the electromagnetic radiation associated with the quantumly entangled particles for comparison to idler signals of the quantumly entangled particles to determine properties of the environment based on the comparison.

18. The quantum sensor of claim 17, wherein the quantum sensor is anchored through a casing of the wellbore during either a completion of the wellbore or after the completion of the wellbore.

19. The quantum sensor of claim 18, wherein a base of the quantum sensor that anchors the quantum sensor through the casing of the wellbore is coated, at least in part, through a curing ceramic material.

20. A system comprising:

a quantum sensor comprising:

a quantum source configured to:

generate quantumly entangled particles while the quantum sensor is disposed within a wellbore; and emit electromagnetic radiation associated with the quantumly entangled particles from a first location, in the wellbore to a second location disposed in a subterranean strata, wherein the second location is disposed outside the wellbore;

a detector configured to generate data indicative of detect reflections of the electromagnetic radiation associated with the quantumly entangled particles for comparison to idler signals of the quantumly entangled particles to determine properties of the environment based on the comparison;

one or more processors; and at least one computer-readable storage medium having stored therein instructions which, when executed by the one or more processors, cause the one or more processors to:

access the data indicative of detected reflections of the electromagnetic radiation associated with the quantumly entangled particles; and identify properties of the environment based on a comparison of the detected reflections of the electromagnetic radiation associated with the quantumly entangled particles to corresponding idler signals of the quantumly entangled particles.

* * * * *